United States Patent
Noguchi et al.

(10) Patent No.: US 11,021,083 B2
(45) Date of Patent: Jun. 1, 2021

(54) SEAT LOCK DEVICE

(71) Applicant: MITSUI KINZOKU ACT CORPORATION, Kanagawa (JP)

(72) Inventors: Katsunori Noguchi, Kanagawa (JP); Makoto Kondo, Kanagawa (JP); Hidemasa Hirakui, Kanagawa (JP); Junichi Shimada, Kanagawa (JP)

(73) Assignee: MITSUI KINZOKU ACT CORPORATION, Kanagawa (JP)

(*) Notice: Subject to any disclaimer, the term of this patent is extended or adjusted under 35 U.S.C. 154(b) by 614 days.

(21) Appl. No.: 15/779,466

(22) PCT Filed: May 30, 2017

(86) PCT No.: PCT/JP2017/020158
§ 371 (c)(1),
(2) Date: May 25, 2018

(87) PCT Pub. No.: WO2018/220726
PCT Pub. Date: Dec. 6, 2018

(65) Prior Publication Data
US 2021/0023967 A1     Jan. 28, 2021

(51) Int. Cl.
*B60N 2/22*      (2006.01)
*E05B 85/00*      (2014.01)
(Continued)

(52) U.S. Cl.
CPC ............ *B60N 2/2245* (2013.01); *B60N 2/20* (2013.01); *B60N 2/433* (2013.01); *E05B 85/00* (2013.01); *E05B 85/24* (2013.01); *B60N 2/10* (2013.01)

(58) Field of Classification Search
CPC ........ B60N 2/2245; B60N 2/20; B60N 2/433; B60N 2/10; B60N 2/22; B60N 2/01583;
(Continued)

(56) References Cited

U.S. PATENT DOCUMENTS 4,995,654 A * 2/1991 Nishigami .............. E05B 77/12
                                                         292/216
6,945,585 B1 * 9/2005 Liu ..................... B60N 2/01583
                                                         292/216
(Continued)

FOREIGN PATENT DOCUMENTS

| CN | 101133224 A | 2/2008 |
|----|-------------|--------|
| CN | 101357607 A | 2/2009 |

(Continued)

OTHER PUBLICATIONS

Chinese Office Action issued in corresponding Chinese Patent Application No. 201780003757.8, dated Jul. 23, 2020, with English translation.

(Continued)

*Primary Examiner* — Mark R Wendell
(74) *Attorney, Agent, or Firm* — McDermott Will & Emery LLP

(57) ABSTRACT

A seat lock device includes: a hook member; and a cam plate. The hook member includes: a hook inclined edge surface and is rotationally biased by contact with a striker entering; an engaging groove into which the striker entering fits after crossing the hook inclined edge surface to bring the hook member into a locked position; a restraining pin; and an interlock pin, the cam plate is set to a limiting position when the hook member engages with the striker and is switched to an allowing position when the striker enters and when an operation performed to release an engagement of the striker, and the cam plate includes: a cam surface that contacts with the restraining pin to rotationally bias the hook member; and an interlock surface with which the interlock pin contacts when the hook member has turned from the locked position.

10 Claims, 17 Drawing Sheets

(51) Int. Cl.
*E05B 85/24* (2014.01)
*B60N 2/20* (2006.01)
*B60N 2/433* (2006.01)
*B60N 2/10* (2006.01)

(58) Field of Classification Search
CPC .............. B60N 2/01516; B60N 2/01541; B60N 2/366; E05B 85/00; E05B 85/24
USPC ............... 297/378.11, 378.13, 335, 336
See application file for complete search history.

(56) References Cited

U.S. PATENT DOCUMENTS

| | | | | |
|---|---|---|---|---|
| 7,044,552 | B2* | 5/2006 | Muller | B60N 2/01583 |
| | | | | 296/65.03 |
| 7,575,280 | B2* | 8/2009 | Palomba | B60N 2/01583 |
| | | | | 296/65.03 |
| 7,762,605 | B2* | 7/2010 | Otsuka | B60N 2/3011 |
| | | | | 296/65.03 |
| 7,854,461 | B2* | 12/2010 | Yamada | B60N 2/305 |
| | | | | 296/65.05 |
| 7,926,858 | B2* | 4/2011 | Otsuka | B60N 2/01583 |
| | | | | 292/216 |
| 8,029,030 | B2* | 10/2011 | Shimura | E05B 83/16 |
| | | | | 292/216 |
| 8,118,342 | B2* | 2/2012 | Kokubo | E05C 3/24 |
| | | | | 296/65.16 |
| 8,282,141 | B2* | 10/2012 | Paing | B60N 2/01583 |
| | | | | 292/216 |
| 8,950,810 | B2* | 2/2015 | Dryburgh | B60N 2/305 |
| | | | | 297/336 |
| 9,771,002 | B2* | 9/2017 | Demirci | B60N 2/01583 |
| 10,214,124 | B2* | 2/2019 | Noguchi | B60N 2/20 |
| 10,308,142 | B2* | 6/2019 | Gordeenko | B60N 2/366 |
| 2006/0082204 | A1* | 4/2006 | Zhang | B60N 2/01583 |
| | | | | 297/366 |
| 2009/0033138 | A1 | 2/2009 | Yamada et al. | |
| 2009/0056393 | A1 | 3/2009 | Otsuka | |
| 2009/0295186 | A1 | 12/2009 | Kokubo et al. | |
| 2010/0032967 | A1* | 2/2010 | Otsuka | B60N 2/01583 |
| | | | | 292/240 |
| 2013/0129413 | A1 | 5/2013 | Dryburgh et al. | |
| 2015/0061349 | A1 | 3/2015 | Handl | |
| 2015/0306991 | A1 | 10/2015 | Ban et al. | |
| 2016/0010370 | A1* | 1/2016 | Sugiura | B60N 2/01583 |
| | | | | 292/96 |
| 2018/0290565 | A1* | 10/2018 | Tone | B60N 2/366 |

FOREIGN PATENT DOCUMENTS

| | | |
|---|---|---|
| CN | 202368408 U | 8/2012 |
| CN | 104271393 A | 1/2015 |
| CN | 104854290 A | 8/2015 |
| GB | 2485641 A | 5/2012 |
| JP | 2001-130295 A | 5/2001 |
| JP | 2007-223506 A | 9/2007 |
| JP | 2008-213695 A | 9/2008 |
| JP | 2008-221999 A | 9/2008 |
| JP | 2009-052223 A | 3/2009 |
| JP | 2009-286253 A | 12/2009 |
| JP | 2010-143445 A | 7/2010 |
| JP | 4847901 B2 | 12/2011 |
| JP | 2013-151852 A | 8/2013 |
| JP | 2014-121910 A | 7/2014 |
| WO | 2017/082235 A1 | 5/2017 |

OTHER PUBLICATIONS

Search Report issued in corresponding International Patent Application No. PCT/JP2017/020158, dated Jul. 18, 2017.

* cited by examiner

SEAT LOCK DEVICE

CROSS REFERENCE

This application is the U.S. National Phase under 35 U.S.C. § 371 of International Application No. PCT/JP2017/020158, filed on May 30, 2017, the entire contents of which is hereby incorporated by reference.

FIELD

The present invention relates to a seat lock device that holds a seat back at a locked state, the seat back being able to be lowered and raised.

BACKGROUND

A seat of a vehicle includes a seat cushion as a seat and a seat back as a back, in which the seat back can be switched in a lowering/raising manner between an upright attitude as normal seating use and a lowered attitude lowered forward for the convenience of loading. In the upright attitude for seating, a seat lock device, which is provided within the seat back, engages with a striker fixed to a vehicle main body and is thereby held at a locked state to be stabilized. The upright attitude may be switchable in two stages by an internal mechanism of the seat lock device.

In the invention described in Patent Literature 1, for example, an engaging groove of a hook member elastically rotationally biased within the seat lock device engages with a striker to lock the seat back, in which the engagement of the hook member and the striker is released by an operation on an open lever.

The seat lock device installed in a vehicle may receive vibration or impact, and also in that case, it is desirable that the engagement state of the hook member and the striker be maintained. For this purpose, in the invention described in Patent Literature 1, a protrusion of the hook member engages with an L-shaped groove provided in the open lever, thereby inhibiting the turning of the hook member caused by vibration or impact.

In addition, in this invention, in an engagement operating process in which the striker is caused to engage with the hook member from a lock released state, the striker comes into contact with an inclined marginal part of the open lever to turn the open lever in a releasing direction and further turns the hook member in a releasing direction.

CITATION LIST

Patent Literature

Patent Literature 1: Japanese Patent No. 4847901

SUMMARY

Technical Problem

In the invention described in Patent Literature 1, owing to its structure, the striker when entering comes into contact with the open lever prior to the hook member, and the open lever is required to be formed in a larger size accordingly, leading to an increase in weight. Consequently, when the open lever is operated to release the striker from the hook member, its operating load is heavy, and operability degrades.

Even when the engagement state of the hook member and the striker is maintained when the seat lock device receives vibration or impact, the hook member may wobble within the range of some gap, and a small sound may occur; sounds can continue to occur continuously depending on the travel state of the vehicle.

The present invention has been made in view of the foregoing problems, and an object thereof is to provide a seat lock device that can improve operability for releasing the engagement of the hook member and the striker and can prevent the wobbling of the hook member.

Solution to Problem

To resolve the above problems and attain the object, according to the present invention, a seat lock device includes: a hook member elastically rotationally biased in a positive direction; and a cam plate elastically rotationally biased in the positive direction. Further, the hook member includes: a hook inclined edge surface that is provided on another end relative to a support shaft near one end and is rotationally biased in a negative direction by contact with a striker entering; an engaging groove with a depth into which the striker entering fits after crossing the hook inclined edge surface to bring the hook member into a locked position; a restraining pin protruding sideways; and an interlock pin protruding sideways, the cam plate is set to a limiting position that limits turning of the hook member in the negative direction when the hook member engages with the striker to be at the locked position and is switched to an allowing position that allows the turning of the hook member in the negative direction when the striker enters and when an operation to release an engagement of the striker has been performed, and the cam plate includes: a cam surface that comes into contact with the restraining pin to rotationally bias the hook member in the positive direction when being at the limiting position; and an interlock surface with which the interlock pin comes into contact before the striker escapes from the engaging groove when the hook member has turned in the negative direction from the locked position.

With this configuration, the hook member is moderately pressed by the cam surface of the cam plate, and wobbling is prevented. In unexpected situations other than when the striker enters and at the time of an operation for releasing the engagement with the striker, or even when the hook member slightly turns by receiving vibration or impact, for example, the interlock surface limits the turning thereof beyond that before the striker escapes from the engaging groove. This interlock mechanism has no relation to the open lever, and the open lever can be formed smaller in size and lighter in weight, thus improving operability.

The seat lock device may have a sensing lever elastically rotationally biased in the positive direction. The sensing lever includes a sensing inclined edge surface rotationally biased in the negative direction by contact with the striker entering and a stopper pin, provided on a side opposite to the sensing inclined edge surface when viewed from a support shaft, that presses a stopper surface of the cam plate to hold the cam plate at the allowing position when the striker is separate at an initial position. The cam plate has a clearance groove provided between the cam surface and the interlock surface. When the striker enters and comes into contact with the hook inclined edge surface to turn the hook member in the negative direction, the cam plate may be held at the allowing position by the stopper pin so as to cause at least a part of the interlock pin to enter the clearance groove.

By this action of the sensing lever, when the striker enters, the cam plate is held at the allowing position, the interlock function is disabled so as to cause the interlock pin not to interfere with the interlock surface, and the hook member can be appropriately turned.

In this case, the striker may enter, come into contact with the sensing inclined edge surface, and turn the sensing lever in the negative direction to separate the stopper pin from the stopper surface, and the cam plate may be turned in the positive direction from the allowing position to cause the cam surface to come into contact with the restraining pin.

In this case, when the striker enters to come into contact with the hook inclined edge surface and then comes into contact with the sensing inclined edge surface in a delayed manner, it becomes easier to take operation timing.

The sensing lever may include a sensing face that comes into contact with the striker to hold the sensing lever at a sensing position when the striker fits into the engaging groove at an end of the sensing inclined edge surface and a unit that transmits a fact that the sensing lever is at the sensing position to an external indicator. With this configuration, the fact that the seat back has been surely locked can be confirmed.

The seat lock device may include: an open lever elastically rotationally biased in the negative direction, and the open lever includes: a hook releasing lever that, when being turned in the positive direction through a force received from an operating unit, presses a hook releasing pin provided in the hook member while being in sliding contact with the hook releasing pin to turn the hook member in the negative direction until the striker escapes from the engaging groove, and cam releasing lever surface that presses a cam releasing pin provided in the cam plate while being in sliding contact with the cam releasing pin to turn the cam plate in the negative direction to the allowing position. When the open lever is turned in the positive direction, and the hook member is turned in the negative direction, the cam plate may be turned to the allowing position so as to cause at least a part of the interlock pin to enter the clearance groove.

With this configuration of the open lever, the interlock function is disabled so as to cause the interlock pin so as not to interfere with the interlock surface, and the hook member can be appropriately turned. In this case, the hook releasing pin and the interlock pin may be the same pin for both uses.

When the open lever includes: a cam holding curved surface that is formed continuously from an end of the cam releasing lever surface and holds the cam plate at the allowing position while being in sliding contact with the cam releasing pin, and when the open lever is turned in the positive direction, after the cam releasing lever surface has come into contact with the cam releasing pin, the hook releasing lever comes into contact with the hook releasing pin in a delayed manner, and the cam plate turns prior to the hook member to be held at the allowing position, it becomes easier to take operation timing.

When the open lever further includes: a limiting pin that limits a turning range sideways, it becomes easier to appropriately limit the turning.

When the cam plate is provided on an open lever side of an entering path of the striker and on a support shaft side of the hook member of a perpendicular line passing through a support shaft of the open lever and relative to the entering path when viewed along an axial direction of the hook member, it becomes possible to have a compact shape with less wasted space as a whole.

The striker is a first striker, and the first striker integrally operates together with a second striker spaced apart by a fixed distance, the hook member includes a loosely fitting groove between the engaging groove and a support shaft, and after the hook member has turned in the negative direction, and the first striker has escaped from the engaging groove based on an operation by an operator, the first striker further enters to enter the loosely fitting groove, the second striker reaches an entrance of the engaging groove, and the hook member returns in the positive direction to cause the first striker to loosely fit into the loosely fitting groove and to cause the second striker to engage with the engaging groove. With this configuration, the upright attitude of the seat back can be set in two stages.

Advantageous Effects of Invention

With the seat lock device according to the present invention, the hook member is moderately pressed by the cam surface of the cam plate, and wobbling is prevented. Even when the hook member slightly turns by receiving vibration or impact, the interlock surface limits the turning thereof beyond that before the striker escapes from the engaging groove to maintain the locked state. Further, this interlock mechanism has no relation to the open lever, and the open lever can be formed smaller in size and lighter in weight, thus improving operability.

BRIEF DESCRIPTION OF DRAWINGS

FIG. 8-1 is a schematic diagram of a first state in a first case in which the hook member turns.

FIG. 8-2 is a schematic diagram of a second state in the first case in which the hook member turns.

FIG. 8-3 is a schematic diagram of a third state in the first case in which the hook member turns.

FIG. 8-4 is a schematic diagram of a fourth state in the first case in which the hook member turns.

FIG. 9-1 is a schematic diagram of a first state in a second case in which the hook member turns.

FIG. 9-2 is a schematic diagram of a second state in the second case in which the hook member turns.

FIG. 9-3 is a schematic diagram of a third state in the second case in which the hook member turns.

FIG. 9-4 is a schematic diagram of a fourth state in the second case in which the hook member turns.

FIG. 9-5 is a schematic diagram of a fifth state in the second case in which the hook member turns.

DESCRIPTION OF EMBODIMENTS

The following describes an embodiment of a seat lock device according to the present invention in detail with reference to the accompanying drawings. Note that this embodiment does not limit the present invention.

Figure 1:
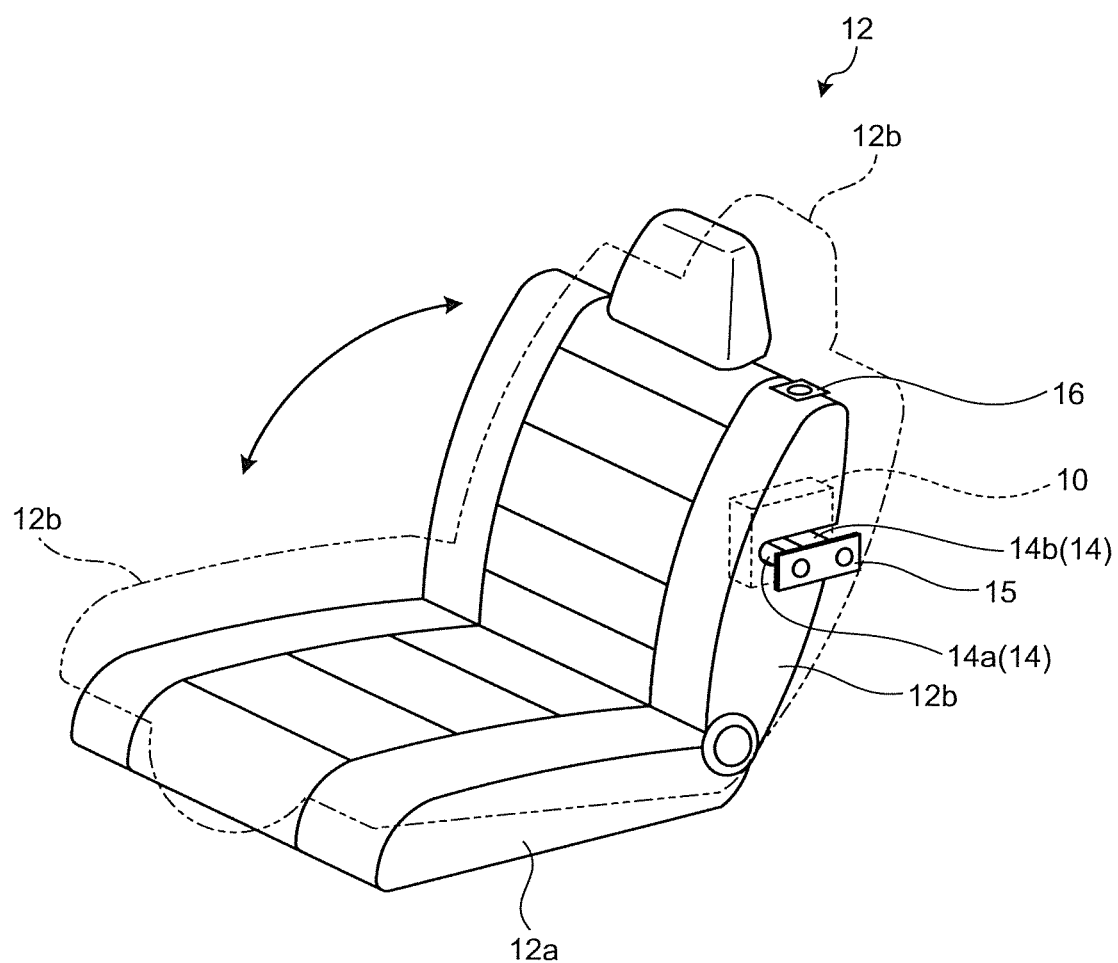
FIG. 1 is a schematic diagram of a seat where a seat lock device is used.

As illustrated in FIG. 1, this seat lock device 10 according to the present embodiment is applied to a seat 12 of a vehicle. The seat 12 includes a seat cushion 12a as a seat and a seat back 12b as a back, in which the seat back 12b can be switched in a lowering/raising manner between an upright attitude as normal seating use and a lowered attitude lowered forward for the convenience of loading. The upright attitude is switchable between two stages: a standard upright attitude and an upright attitude inclined more than the standard upright attitude (hereinafter, referred to as an inclined upright attitude), by an internal mechanism of the seat lock device 10. FIG. 1 illustrates the standard upright attitude of the seat back 12b by the solid line and illustrates the lowered attitude and the inclined upright attitude by the virtual line.

The seat lock device 10 is provided within the seat back 12b slightly below a shoulder thereof and can lock the seat back 12b to the two upright attitudes by causing the seat lock device 10 to engage with a first striker 14a or a second striker 14b made of metal fixed to a vehicle body panel. By releasing the engagement of the seat lock device 10 and the first striker 14a or the second striker 14b, the seat back 12b can be lowered to the lowered attitude.

The first striker 14a and the second striker 14b are arranged in a row spaced apart from each other by a fixed distance, in which their tips are connected to each other to form a rectangle having an opening on one end thereof, and the opening side is fixed to a striker base 15. Either the first striker 14a or the second striker 14b is also called a striker 14 representatively.

By raising the seat back 12b from the lowered attitude, first, the first striker 14a engages with the seat lock device 10 to be the standard upright attitude. Subsequently, by performing a raising operation on an operating knob (an operating unit) 16 provided on the shoulder of the seat back 12b, the engagement of the seat lock device 10 and the first striker 14a is released; by lowering the seat back 12b deeper, the second striker 14b engages with the seat lock device 10 to be locked in the inclined upright attitude, or by lowering the seat back 12b forward again, the seat back 12b is returned to the lowered attitude. Engagement in the inclined upright attitude is released also by the raising operation on the operating knob 16.

Next, described first is the following four main components of the seat lock device 10, that is, a hook member 20, a cam plate 50, a sensing lever 70, and an open lever 100 with reference to FIG. 2 to FIG. 5 before a detailed description of the seat lock device 10. FIG. 2 to FIG. 5 illustrate the respective components with the perspective views, which illustrate states viewed from nearly the same direction as that of FIG. 6 as a side view. In the following description, the clockwise rotational direction when the seat lock device 10 is viewed from one side as illustrated in FIG. 6 is defined as a positive direction, whereas the counterclockwise rotational direction is defined as a negative direction. For the convenience of description, up and down and right and left are represented based on the state illustrated in FIG. 6.

Figure 2:
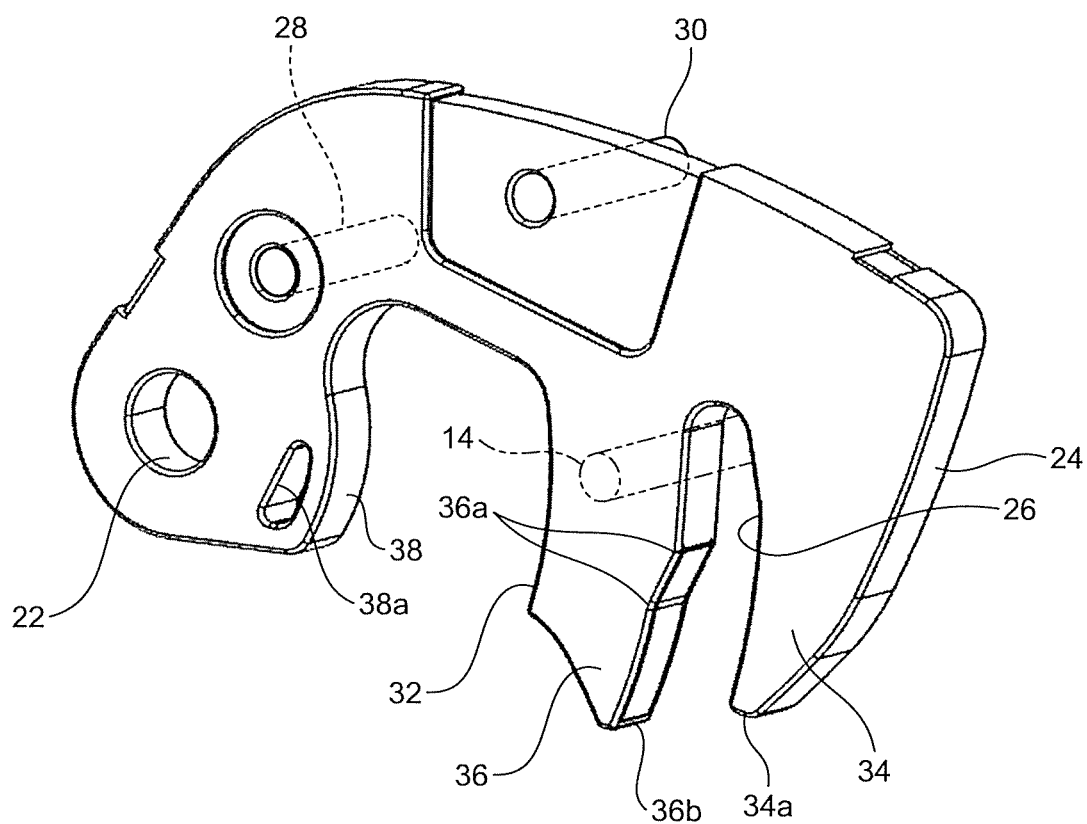
FIG. 2 is a perspective view of a hook member.

The hook member 20 illustrated in FIG. 2 is a component that holds the seat back 12b at a locked state by engagement with the striker 14 and is elastically rotationally biased in the positive direction within the seat lock device 10.

The hook member 20 is a plate-shaped member and has a shaft hole 22 provided near one end and a hook inclined edge surface 24 that is rotationally biased in the negative direction by contact with the striker 14 that enters from the right. The hook member 20 has an engaging groove 26 with a depth into which the striker 14 entering fits after crossing the hook inclined edge surface 24 to bring the hook member 20 into a locked position, a restraining pin 28 protruding sideways on the far side of the drawing sheet, an interlock pin 30 protruding sideways on the far side of the drawing sheet, and a loosely fitting groove 32 provided between the engaging groove 26 and a support shaft.

Further, the hook member 20 has a first horn 34 and a second horn 36 protruding downward on a side opposite to the shaft hole 22. The hook inclined edge surface 24 is formed as an outer face of the first horn 34, the engaging groove 26 is formed as a space present between the first horn 34 and the second horn 36, and the loosely fitting groove 32 is formed between the second horn 36 and the shaft hole 22. On the left face of the engaging groove 26, that is, on the right face of the second horn 36, gentle bent parts 36a are provided. The hook inclined edge surface 24 is a curved inclined face that comes close to the shaft hole 22 as it is directed downward. The engaging groove 26 is a groove having an opening slightly wider than the striker 14 and a thinner inner part, and the innermost part thereof is formed to be slightly narrower than the striker 14. A tip 34a of the first horn 34 and a tip 36b of the second horn 36 are both ends of the opening of the engaging groove 26.

The second horn 36 is formed to be slightly longer downward than the first horn 34; the striker 14 entering from the right crosses the hook inclined edge surface 24 and then comes into contact with the lower part of the second horn 36 to be guided to the engaging groove 26.

The loosely fitting groove 32 is a sufficiently wide area into which the first striker 14a loosely fits when the second striker 14b engages with the engaging groove 26. On a part of the loosely fitting groove 32 with which the first striker 14a first comes into contact, a swelled part 38 for giving sufficient strength is provided, and a buffer hole 38a for absorbing impact is provided therewithin.

The restraining pin 28 is a part pressed by the cam plate 50 in order to prevent the wobbling of the hook member 20 and is provided near the shaft hole 22. The interlock pin 30 is a part playing an interlock function that, when the hook member 20 receives vibration or impact to turn in the negative direction, comes into contact with the cam plate 50 to prevent the turning thereof beyond that and is provided at a position farther than the restraining pin 28 relative to the shaft hole 22. The hook member 20 has a metal plate for ensuring strength as a base covered with a resin material.

Figure 3:
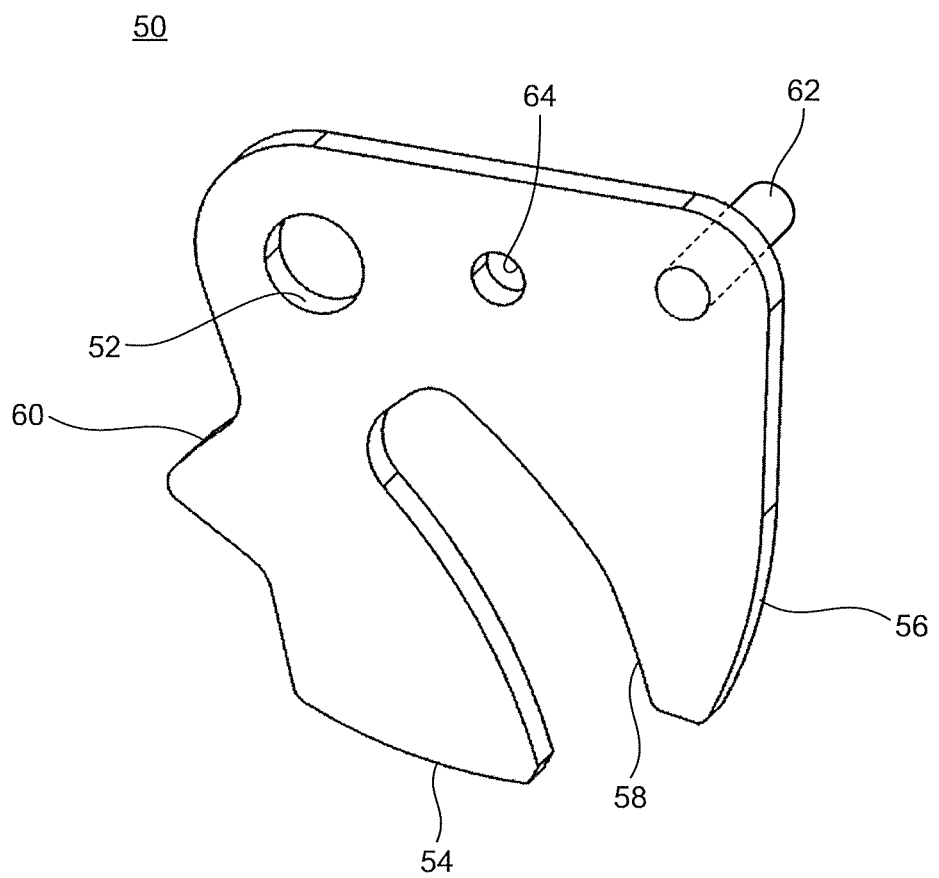
FIG. 3 is a perspective view of a cam plate.

The cam plate 50 illustrated in FIG. 3 is a component for a wobbling prevention function for the hook member 20 and the interlock function that, when the hook member 20 turns in the negative direction caused by vibration or impact, limits the turning, and is elastically rotationally biased in the positive direction within the seat lock device 10.

The cam plate 50 is a plate-shaped member made of metal having a substantially crab's claw shape and has a shaft hole 52 provided near one end, a cam surface 54, and an interlock surface 56. When the hook member 20 engages with the striker 14 to be at the locked position, the cam plate 50 is at a limiting position that limits the turning of the hook member 20 in the negative direction and is switched to a pin retraction position (an allowing position) when the striker 14 enters and when an operation to release the engagement of the striker 14 has been performed.

The cam surface 54 is formed as part of a lower side and is gently curved as a whole. When the hook member 20 is at the locked position engaging with the striker 14, the cam surface 54 elastically presses the restraining pin 28, thereby rotationally biasing the hook member 20 in the positive direction and preventing the wobbling of the hook member 20.

The interlock surface 56 is formed as part of a right side and is a curved inclined face that bends to the left as it is directed downward. When the hook member 20 receives vibration or impact to turn in the negative direction while the restraining pin 28 presses the cam surface 54, the interlock surface 56 comes into contact with the interlock pin 30 before the striker 14 escapes from the engaging groove 26 to limit the turning.

The cam plate 50 has a clearance groove 58 provided between the cam surface 54 and the interlock surface 56, a stopper surface 60 that comes in contact with the sensing lever 70 when the seat lock device 10 does not engage with the striker 14, a cam releasing pin 62 operated by the open lever 100 at the time of a releasing operation, and a spring engaging hole 64. The shaft hole 52 is provided near one end of the upper side, the cam releasing pin 62 protrudes sideways on the far side of the drawing sheet near the other end, and the spring engaging hole 64 is provided between them.

The clearance groove 58 is a groove for avoiding interference with the interlock pin 30 when the hook member 20 turns in the negative direction at the time of a normal operation by an operator, is slightly wider than the interlock pin 30, and is curved along the operation path thereof.

The stopper surface 60 is formed as an upper face of part of a left side swelling in a triangular shape. The stopper surface 60 is supported by the sensing lever 70 in a pressed manner when the seat lock device 10 does not engage with the striker 14, whereby the cam plate 50 is held at the pin retraction position.

Figure 4:
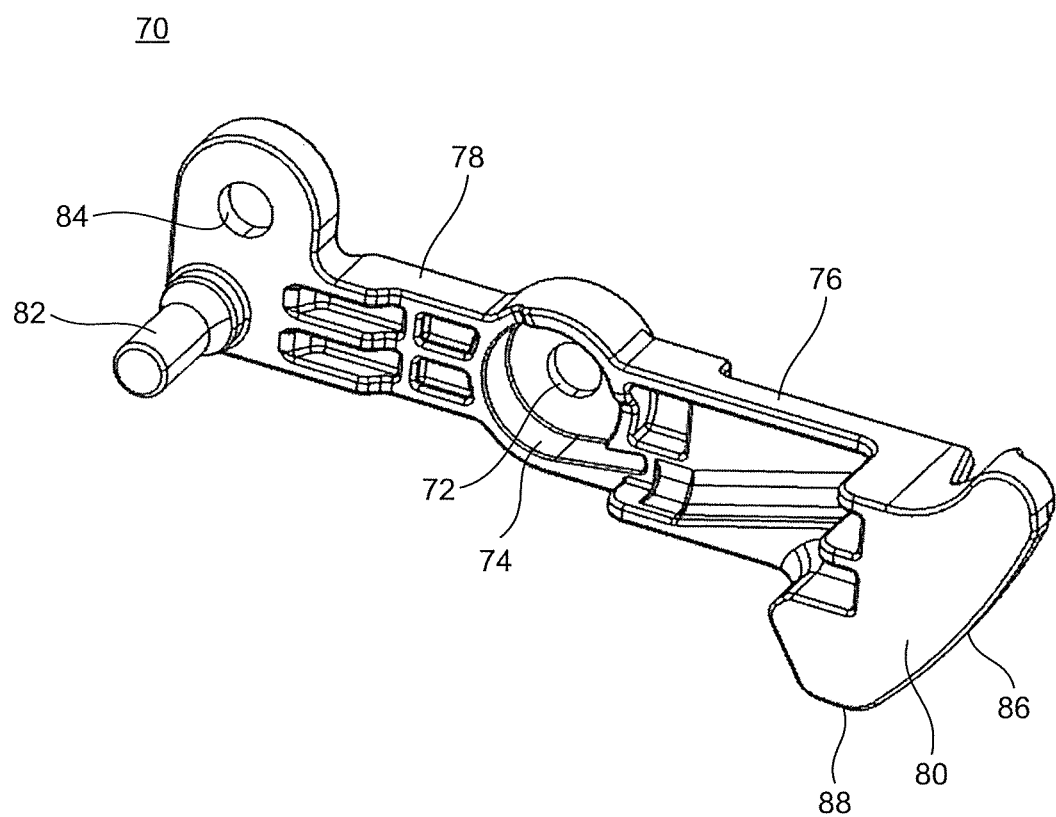
FIG. 4 is a perspective view of a sensing lever.

The sensing lever 70 illustrated in FIG. 4 is a lever member elongated right and left formed of a resin material and is elastically rotationally biased in the positive direction within the seat lock device 10.

The sensing lever 70 has a shaft hole 72 provided at substantially the center thereof, a substantially cylindrical spring chamber 74 formed around the shaft hole 72, a first arm 76 extending to the right, a second arm 78 extending to the left, a detector 80 provided at the tip of the first arm 76, a stopper pin 82 protruding on the near side of the drawing sheet at the rear end of the second arm 78, and a rod hole 84 formed slightly above the stopper pin 82. The first arm 76 and the second arm 78 are linearly arranged in opposite directions and are each reinforced in a three-dimensional manner by some ribs with unnecessary parts removed.

The detector 80 is provided at a position displaced slightly on the near side of the drawing sheet from the tip of the first arm 76 and has a horn shape protruding slightly obliquely upward from the first arm 76. The detector 80 has a sensing inclined edge surface 86 on the right and a sensing surface 88 formed at the lower end of the sensing inclined edge surface 86. The sensing surface 88 protrudes slightly downward from the lower face of the first arm 76. The sensing inclined edge surface 86 forms a gentle curved surface; after the striker 14 enters and comes into contact with the hook inclined edge surface 24 of the hook member 20, the striker 14 comes into contact with the sensing inclined edge surface 86 in a delayed manner, and the sensing inclined edge surface 86 is rotationally biased in the negative direction.

When the striker 14 fits into the engaging groove 26 of the hook member 20 to be at the locked position, the sensing surface 88 comes into contact with the striker 14, thereby holding the sensing lever 70 at a sensing position. The fact that the sensing lever 70 is held at the sensing position by the sensing surface 88 is transmitted to an external indicator via the rod hole 84 provided on the opposite side. With this configuration, it can be determined that the seat back 12b has been surely locked.

The stopper pin 82 presses the stopper surface 60 of the cam plate 50 when the seat lock device 10 is at an initial position in which it does not engage with the striker 14, thereby holding the cam plate 50 at the pin retraction position. The sensing lever 70 is at either the initial position or the sensing position as stationary states.

Figure 5:
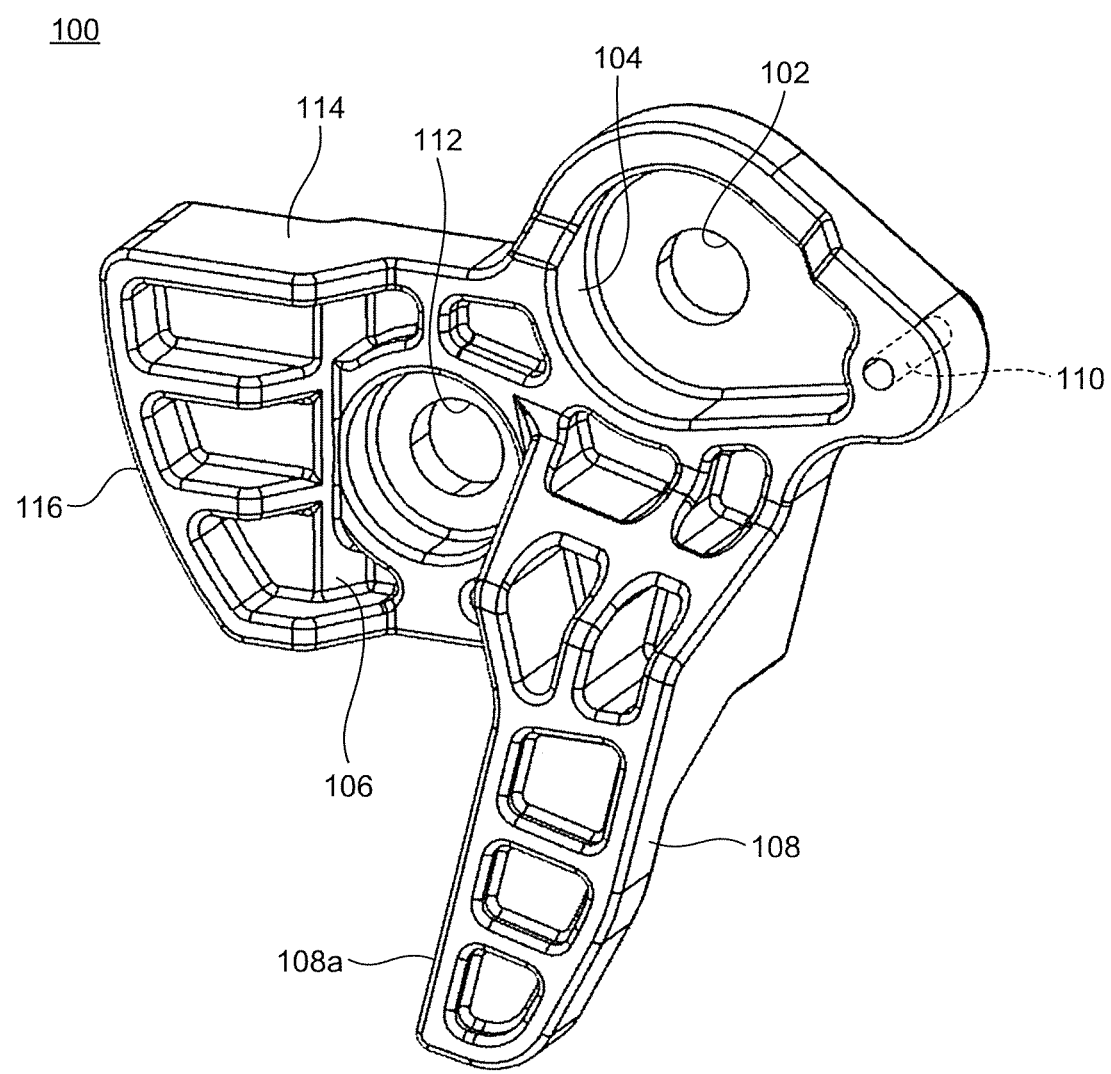
FIG. 5 is a perspective view of an open lever.
Figure 6:
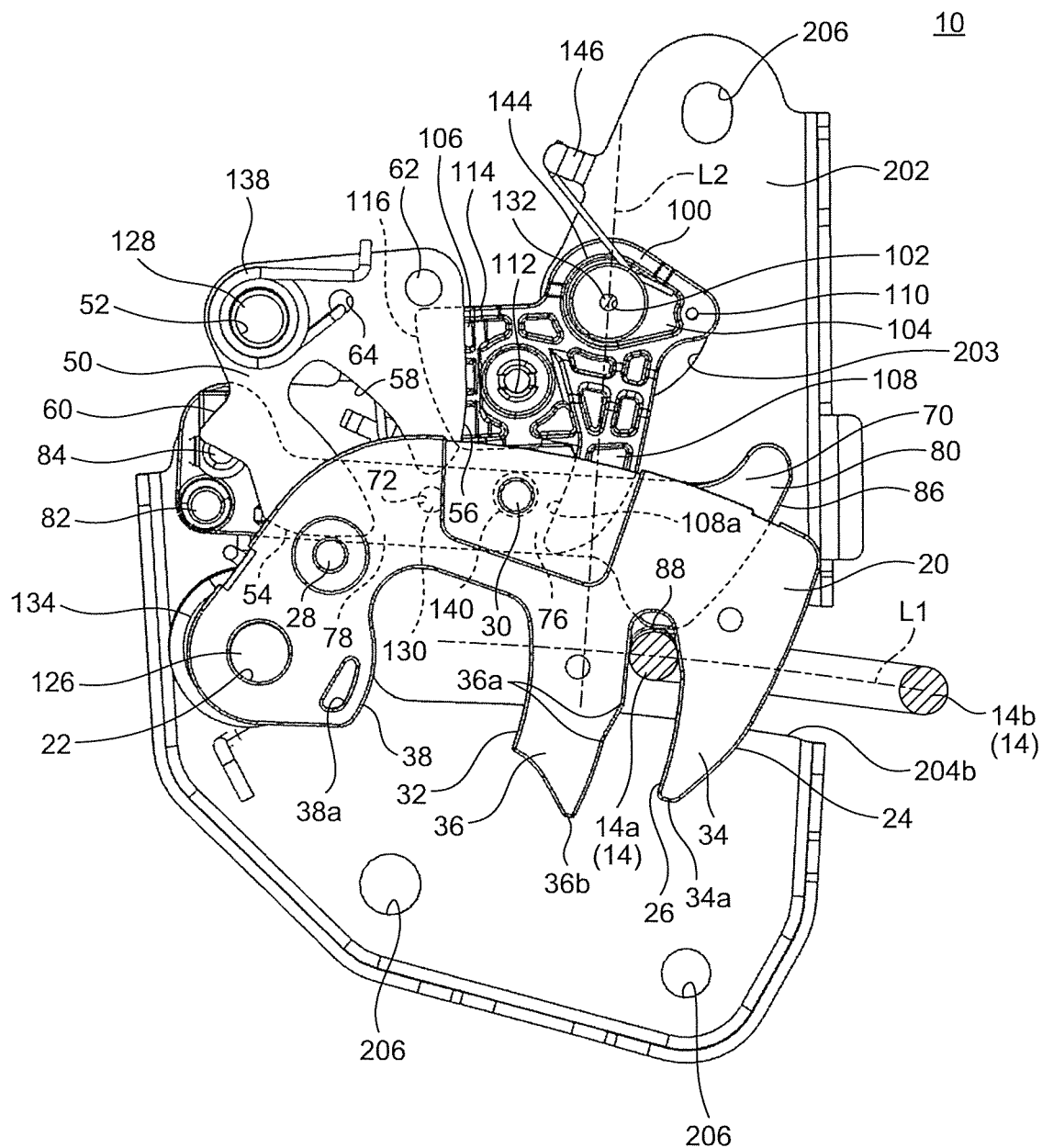
FIG. 6 is a partially omitted side view of the seat lock device.

The open lever 100 illustrated in FIG. 5 is a component operated from the operating knob 16 (see FIG. 1) in order to release the engagement of the hook member 20 and the striker 14 and is elastically rotationally biased in the negative direction within the seat lock device 10.

The open lever 100 has a shaft hole 102, a substantially cylindrical spring chamber 104 formed around the shaft hole 102, a cam release acting unit 106, a hook releasing lever 108, and a limiting pin 110.

The cam release acting unit 106 is a slightly wide member protruding in the left direction from the lower part of the spring chamber 104 and the upper part of the hook releasing lever 108 and has a rod hole 112, a cam releasing lever surface 114, and a cam holding curved surface 116. The rod hole 112 is a hole provided at a position at the lower left of the shaft hole 102 and is coupled to the operating knob 16. The rod hole 112 is pulled upward by the operating knob 16 to turn the open lever 100 in the positive direction.

The cam releasing lever surface 114 is a linear plane in a side view formed as the upper side of the cam release acting unit 106. The cam holding curved surface 116 is a curved surface that is formed continuously from the left end of the cam releasing lever surface 114 and has the shaft hole 102 as its center.

When the open lever 100 is turned in the positive direction under the action of the operating knob 16, the cam releasing lever surface 114 presses the cam releasing pin 62 of the cam plate 50 while being in sliding contact therewith to turn the cam plate 50 in the negative direction to the pin retraction position. When the open lever 100 is further turned in the positive direction, the cam holding curved surface 116 holds the cam plate 50 at the pin retraction position while being in sliding contact with the cam releasing pin 62.

The hook releasing lever 108 extends obliquely downward on the near side of the drawing sheet from the lower part of the spring chamber 104. When the open lever 100 is turned in the positive direction under the action of the operating knob 16, a hook releasing lever surface 108a as the left side face of the hook releasing lever 108 presses the interlock pin (a hook releasing pin) 30 of the hook member 20 while being in sliding contact therewith to turn the hook member 20 in the negative direction until the striker 14 escapes from the engaging groove 26. The interlock pin 30 is a component of an interlock function as escape prevention for the striker 14 as described above and also functions as a hook releasing pin that releases the striker 14. The hook releasing pin may be provided as an exclusive pin different from the interlock pin 30. The hook releasing lever 108 and the cam release acting unit 106 are reinforced in a three-dimensional manner by some ribs with unnecessary parts removed. The limiting pin 110 is a pin that protrudes on the far side of the drawing sheet on the slightly right of the shaft hole 102 and limits the turning range of the open lever 100.

Figure 7:
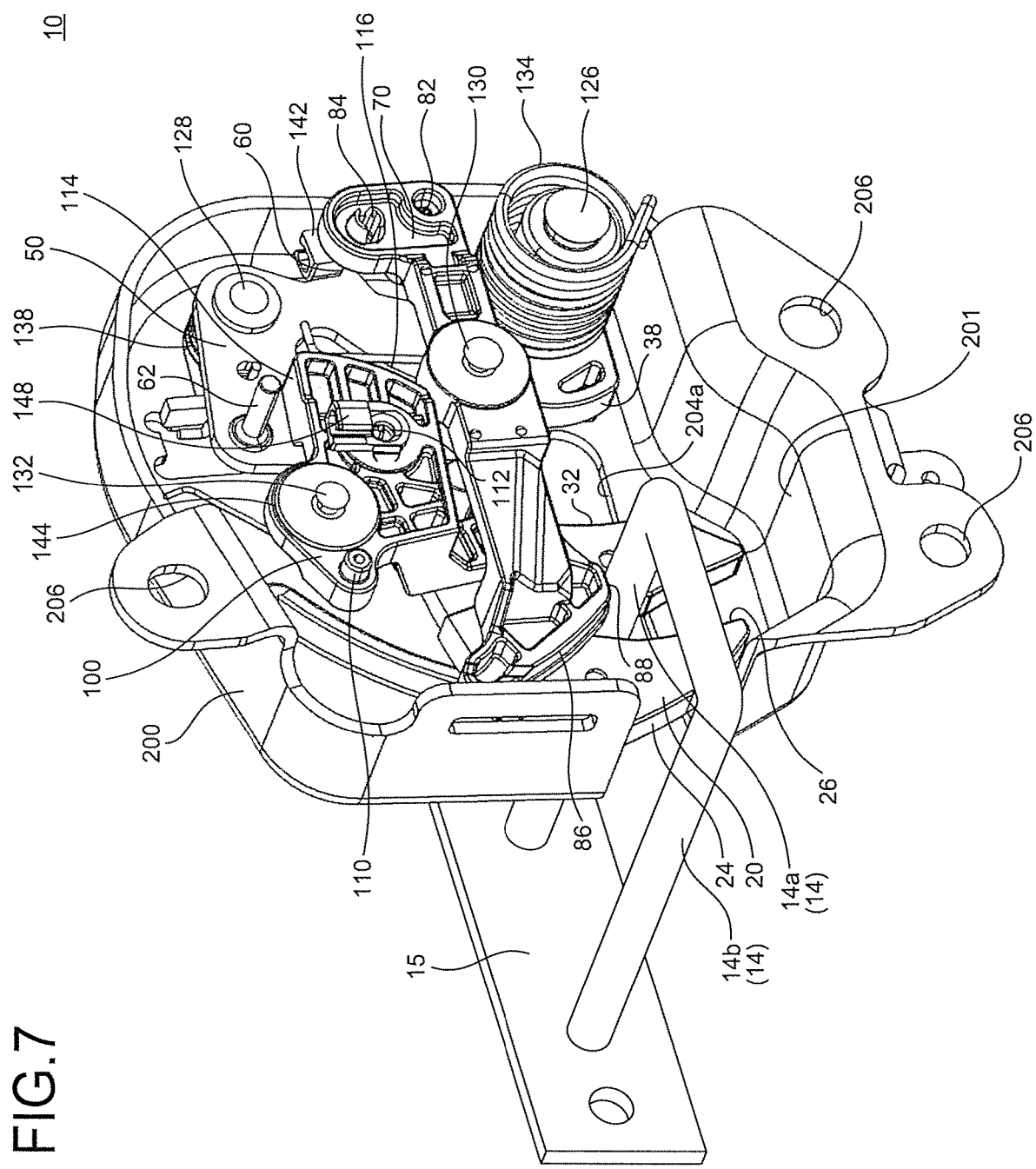
FIG. 7 is a partially omitted perspective view of the seat lock device.

The following describes a configuration of the seat lock device 10 including the hook member 20, the cam plate 50, the sensing lever 70, and the open lever 100 in detail with reference to FIG. 6 and FIG. 7. FIG. 6 and FIG. 7 illustrate a state in which the seat lock device 10 engages with the first striker 14a. FIG. 6 is a side view (a view along the axial direction of the hook member) when the seat lock device 10 is viewed from one side, whereas FIG. 7 is a perspective view from a direction substantially opposite to that of FIG. 6. When the seat back 12b is at the standard upright attitude, the left side of FIG. 6 is the front of a vehicle, whereas the right side thereof is the rear of the vehicle.

A cover member 200 on the near side thereof is removed in FIG. 6, whereas a base member 202 on the near side thereof is removed in FIG. 7, whereby each drawing exposing the inside. The cover member 200 and the base member 202 include striker entering grooves 204a and 204b, respectively, that the striker 14 enters and are combined to be integral to cover substantially the entire inside as the cover and the base of the seat lock device 10. The striker entering grooves 204a and 204b coincide with each other in a side view. The cover member 200 and the base member 202 are also members for mounting the seat lock device 10 on the seat back 12b and include mounting holes 206. The cover member 200 and the base member 202 can prevent foreign matter from entering and make it easy to be mounted on the seat back 12b. A side face of the base member 202 comes into contact with part of the seat back 12b to be fixed thereto.

As illustrated in FIG. 6 and FIG. 7, the seat lock device 10 includes the cover member 200 and the base member 202 as a base and has the hook member 20, the cam plate 50, the sensing lever 70, and the open lever 100. Based on FIG. 6, the hook member 20 is present on the nearest side, the cam plate 50 is present at the upper left on the farther side, and the open lever 100 and the sensing lever 70 are arranged adjacent to each other in an up-and-down direction on the farther side. The open lever 100 and the sensing lever 70 partially overlap with each other in a plan view.

The shaft holes 22, 52, 72, and 102 of the hook member 20, the cam plate 50, the sensing lever 70, and the open lever 100, are pivotally supported by shafts 126, 128, 130, and 132, respectively. The shafts 126, 128, 130, and 132 are fixed to the cover member 200 and/or the base member 202.

The shaft 128 and the shaft 132 are arranged substantially horizontally. The two lines directed toward the shaft 126 and the shaft 132 with the shaft 128 as an apex are substantially orthogonal to each other. The two lines directed toward the shaft 128 and the shaft 126 with the shaft 130 as an apex are substantially orthogonal to each other. The two lines directed toward the shaft 128 and the shaft 132 with the shaft 130 as an apex are substantially orthogonal to each other.

When the first striker 14a engages with the engaging groove 26, the two lines directed toward the shaft 128 and the first striker 14a with the shaft 126 as an apex are substantially orthogonal to each other. In this situation, the angle between the two lines directed toward the first striker 14a and the restraining pin 28 with the shaft 126 as an apex is substantially 45°, and the angle between the two lines directed toward the first striker 14a and the interlock pin 30 is substantially 30°. In this situation, a distance ratio of the first striker 14a, the interlock pin 30, the restraining pin 28, the shaft 128, the shaft 130, and the shaft 132 based on the shaft 126 is approximately 7:5:2:6:4:8. In this situation, the shaft 126, the restraining pin 28, the shaft 130, and the shaft 132 are arranged substantially linearly.

The hook member 20 is pivotally supported by the shaft 126 and is elastically rotationally biased in the positive direction by a slightly large torsion spring 134. As illustrated in FIG. 6, the position of the hook member 20 when the striker 14 engages with the engaging groove 26 is referred to as the locked position. When the hook member 20 is at the locked position, the first horn 34 is displaced to substantially the maximum to the right. The hook member 20, being rotationally biased in the positive direction, is rotationally displaced until the tip 36b of the second horn 36 comes into contact with a bottom surface 201 (see FIG. 7) of the cover member 200 when the seat lock device 10 does not engage with the striker 14.

In contrast, the hook member 20 turning in the negative direction from the locked position includes three cases. A first case is a situation in which the striker 14 enters from the right and comes into contact with the hook inclined edge surface 24 to push the first horn 34 up when the seat back 12b is raised from the lowered attitude to the standard upright attitude. A second case is a situation in which the hook releasing lever 108 pushes the interlock pin 30 up under the action of the open lever 100. A third case is a situation in which the hook member 20 has received large vibration or impact. The first case and the second case are normal operations by the intention of the operator.

The cam plate 50 is pivotally supported by the shaft 128 and is elastically rotationally biased in the positive direction by a torsion spring 138. One end of the torsion spring 138 engages with the spring engaging hole 64. When the hook member 20 engages with the striker 14 to be at the locked position, the cam plate 50 is at the limiting position that limits the turning of the hook member 20 in the negative direction, and the cam surface 54 comes into contact with and presses the restraining pin 28 to prevent the wobbling of the hook member 20. The wobbling of the hook member 20 is prevented, whereby abnormal sounds are eliminated, and besides, component durability can be improved. In addition, the hook member 20 does not turn in the negative direction by some vibration or impact owing to the action of the cam surface 54.

When the hook member 20 receives large vibration or impact, thereby causing the restraining pin 28 to turn the cam surface 54 in the negative direction while pressing it, that is, in the third case, the interlock pin 30 comes into contact with the interlock surface 56 to limit the turning thereof beyond that before the striker 14 escapes from the engaging groove 26 as described below. In the first case and the second case, the cam plate 50 is caused to be at the pin retraction position so as to cause the interlock pin 30 to enter the clearance groove 58 without interfering with the interlock surface 56. Specifically, in the first case, the stopper pin 82 of the sensing lever 70 supports the stopper surface 60 (see FIG. 8-1), whereas in the second case, the cam holding curved surface 116 of the open lever 100 supports the cam releasing pin 62 (see FIG. 9-3).

Further, as can be understood from FIG. 6, the cam plate 50 is provided on the open lever 100 side of an entering path L1 of the striker 14 and on the shaft 126 of the hook member 20 side based on a perpendicular line L2 passing through the shaft 132 of the open lever 100 and relative to the entering path L1. With this configuration, a compact shape without wasteful space as a whole can be achieved.

The sensing lever 70 is pivotally supported by the shaft 130 and is elastically rotationally biased in the positive direction by a torsion spring 140. When the hook member 20 is at the locked position, and the striker 14 appropriately engages with the engaging groove 26, the sensing lever 70 is held at the sensing position slightly turned in the negative direction caused by the sensing surface 88 coming into contact with the upper face of the striker 14. In this process, its positional information is transmitted to an external indicator by an indicator rod (not illustrated) connected to the rod hole 84 via an adapter 142. In other words, the rod hole 84, the adapter 142, and the indicator rod form means for transmitting information. With this configuration, the operator can determine that the seat back 12b has been surely locked.

The open lever 100 is pivotally supported by the shaft 132 and is elastically rotationally biased in the negative direction by a torsion spring 144. One end of the torsion spring 144 engages with the inner wall of the spring chamber 104, whereas the other end thereof engages with a protrusion 146 of the base member 202. The open lever 100 is turned in the positive direction by pulling an operating rod (not illustrated) connected to the rod hole 112 via an adapter 148. The operating rod is connected to the operating knob 16 (see FIG. 1). Other than the rod, a wire may be connected to the adapters 142 and 148, for example. The limiting pin 110 fits into an arcuate hole 203 provided in the base member 202, and both ends of this arcuate hole 203 and the limiting pin 110 come into contact with each other, thereby limiting the turning range of the open lever 100. The limiting pin 110 can limit the turning of the open lever 100 simply and appropriately.

As can be understood from FIG. 6, the open lever 100 is smaller than the hook member 20, and in addition, no large force is applied thereto, and the open lever 100 can be formed of resin and is light in weight. The open lever 100 is a single-function component for releasing engagement, has no relation to the interlock function and the like, and can thereby be formed smaller in size and lighter in weight. Consequently, the open lever 100 is operated lightly by the operating knob 16, thus improving operability.

The following describes three main actions of the thus configured seat lock device 10. The three actions correspond to the respective three cases. Specifically, the three actions include a situation in which the striker 14 enters to engage with the engaging groove 26, a situation in which the engagement of the engaging groove 26 and the striker 14 is released, and a situation in which large vibration or impact has been applied to the hook member 20 to turn the hook member 20 in the negative direction.

Figures 1, 8:
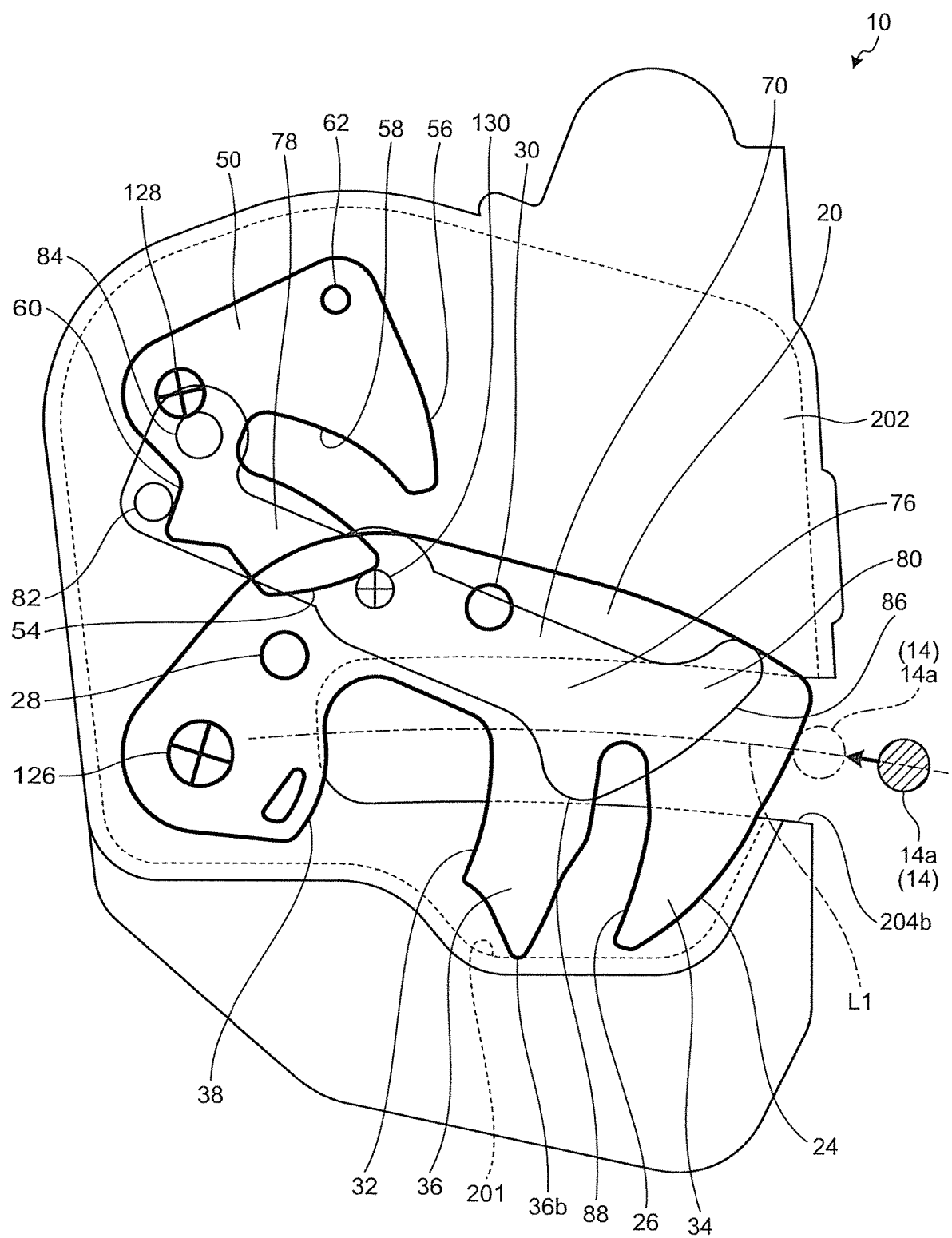
Figures 2, 8:
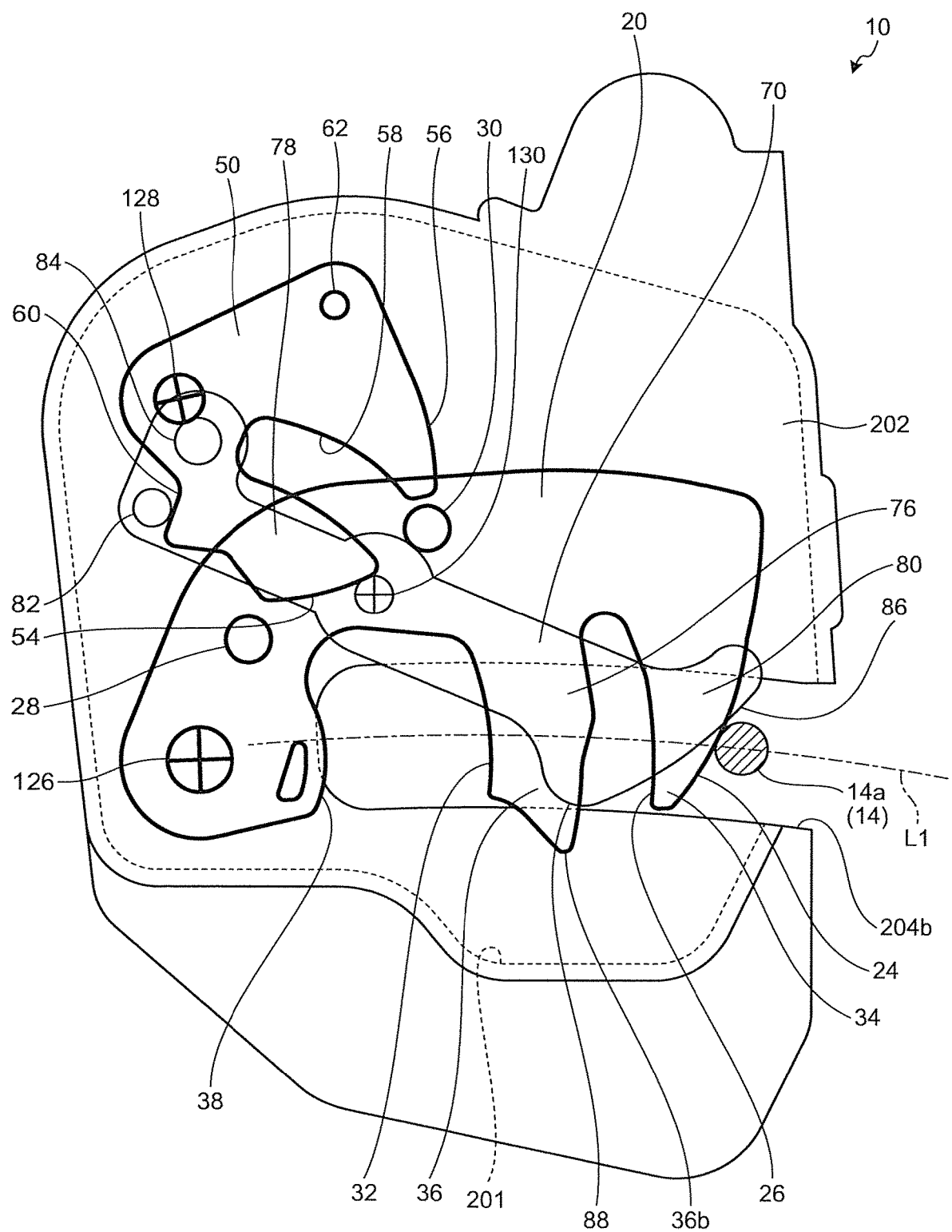
Figures 3, 8:
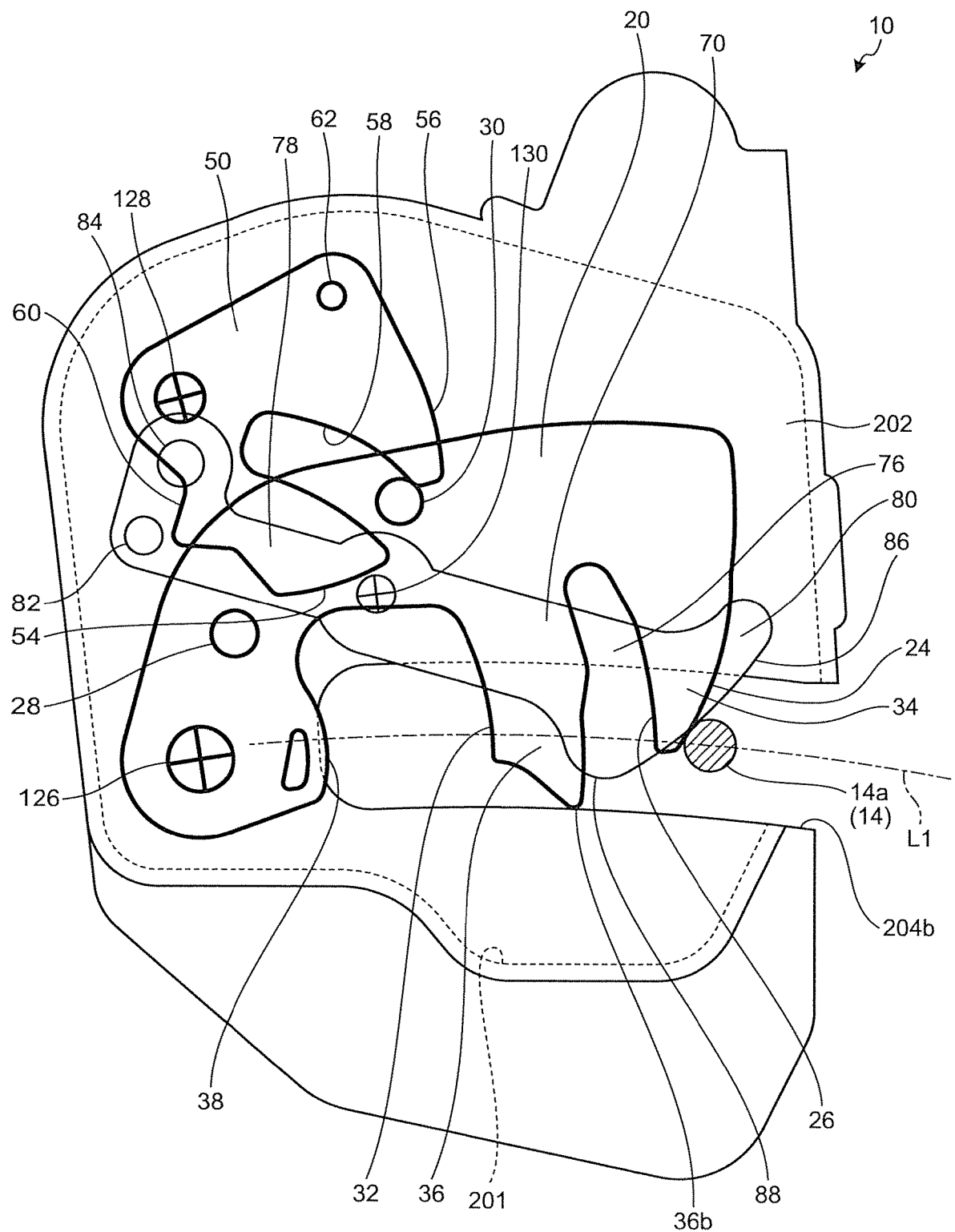
Figures 4, 8:
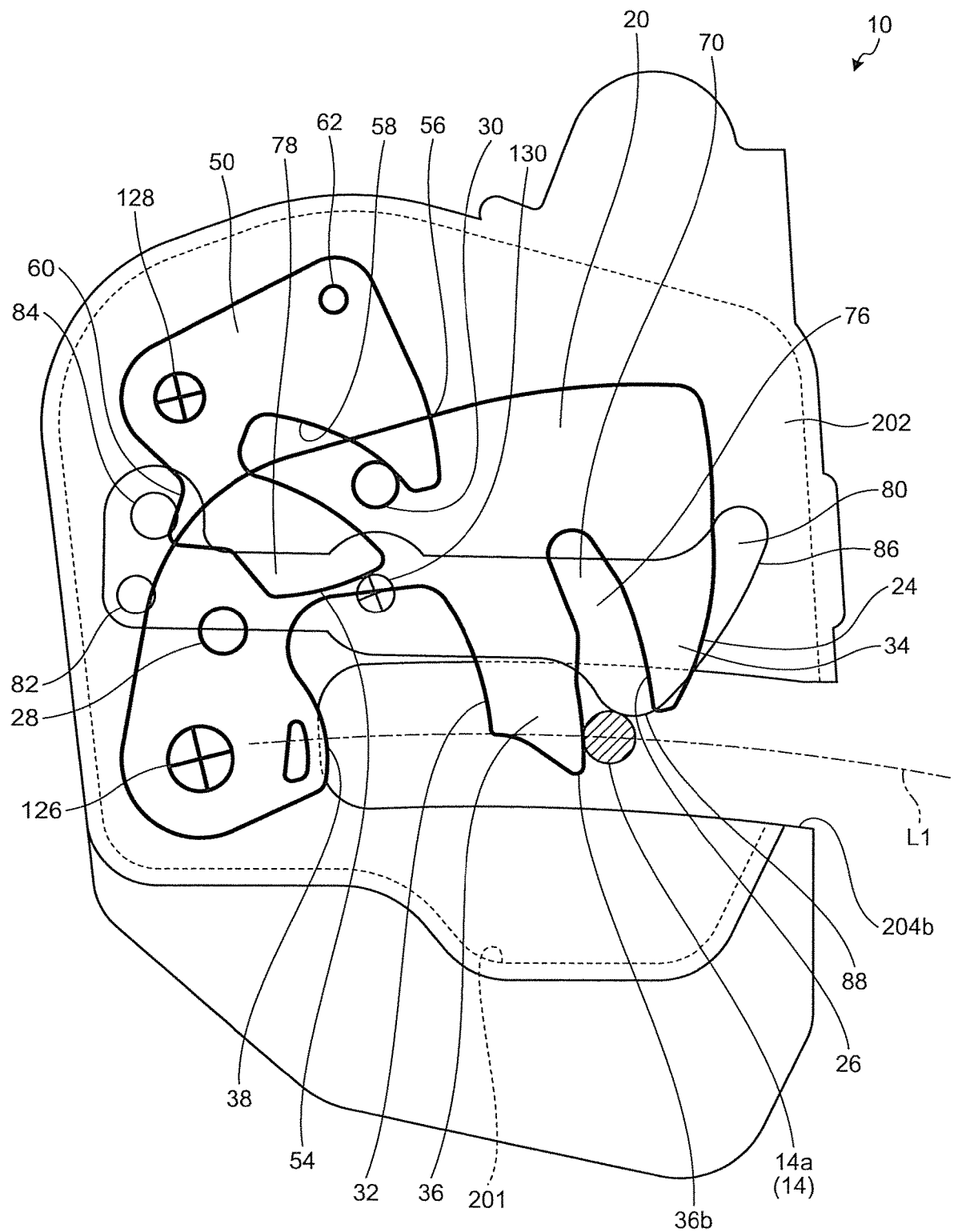

The following describes the action in the first case with reference to FIG. 8-1 to FIG. 8-4. In other words, described is a case in which the striker 14 enters to engage with the engaging groove 26. In this case, the seat back 12b is raised from the lowered attitude to the standard upright attitude by the operator, and the first striker 14a enters from the right when viewed from the seat lock device 10. In this process, there is no need to operate the operating knob 16, and the open lever 100 does not change its orientation.

FIG. 8-1 to FIG. 8-4 illustrate the hook member 20 and the cam plate 50 by the thick line and illustrate the sensing lever 70 by the thin line in order to easily discriminate those components from each other and the open lever 100 is omitted in order to prevent the drawings from being complicated. Although the seat lock device 10 is lowered and raised integrally with the seat back 12b to change its angle, in the following description, it is assumed that seat lock device 10 is fixed and the striker 14 moves with the orientation and position relative to the seat lock device 10 for easy understanding.

As illustrated in FIG. 8-1, in an initial state in which the striker 14 is separate from the seat lock device 10, the hook member 20, the cam plate 50, and the sensing lever 70 are at their initial positions.

Specifically, the hook member 20 is biased in the positive direction to be rotationally displaced until the tip 36b of the second horn 36 comes into contact with the bottom surface 201 of the cover member 200. In this process, the upper part of the hook inclined edge surface 24 of the first horn 34 blocks the entrance of the striker entering groove 204b so as to be oblique relative to the entering path L1 of the striker 14.

The sensing lever 70 is biased in the positive direction to be displaced to the maximum in the positive direction. In this process, the first arm 76 is downward to the right about the shaft 130, and a substantially middle part of the sensing inclined edge surface 86 is arranged so as to be oblique relative to the entering path L1 at the slightly back (the left side in FIG. 8-1) of the hook inclined edge surface 24. The second arm 78 is upward to the left about the shaft 130, and the rod hole 84 is displaced upward. With this configuration, displacement information is transmitted to an indicator via an indicator rod (not illustrated), and the fact that the striker 14 is in a non-engagement state can be visually determined. The stopper pin 82 is also displaced upward to the maximum to support the stopper surface 60 of the cam plate 50.

The cam plate 50, while being biased in the positive direction, is held at the pin retraction position slightly turned in the negative direction from a maximum displaced position in the positive direction with the stopper surface 60 supported by the stopper pin 82. With this configuration, the clearance groove 58 opens in a right-downward direction. In this process, the cam surface 54 is slightly separate from the restraining pin 28, and the interlock surface 56 is separate from the interlock pin 30 to a large extent.

As illustrated by the virtual line in FIG. 8-1, when the first striker 14a enters from the right along the entering path L1 to be about to reach the striker entering groove 204b, the first striker 14a first comes into contact with the upper part of the hook inclined edge surface 24 obliquely and presses it so as to turn the hook member 20 in the negative direction.

As illustrated in FIG. 8-2, the first striker 14a further enters while pressing and turning the hook member 20 in the negative direction while being in sliding contact with the hook inclined edge surface 24 and then comes into contact with the sensing inclined edge surface 86 obliquely. In this process, part of the interlock pin 30 fits in near the upper end of the opening of the clearance groove 58. With this fitting, the interference of the interlock pin 30 and the cam plate 50 is avoided. The upper part of the interlock pin 30 may lightly come into contact with the end of the opening of the clearance groove 58.

As illustrated in FIG. 8-3, the first striker 14a, while being in sliding contact with the hook inclined edge surface 24 and the sensing inclined edge surface 86, further enters while pressing and turning the hook member 20 and the sensing lever 70 in the negative direction. In this process, although the stopper pin 82 is displaced downward to be separate from the stopper surface 60, the cam plate 50 maintains its attitude owing to the upper side face of the clearance groove 58 being in contact with the interlock pin 30. The interlock pin 30 can be displaced within the clearance groove 58, and the hook member 20 appropriately continues to turn in the negative direction.

As illustrated in FIG. 8-4, the first striker 14a that has further entered crosses the hook inclined edge surface 24 and the first horn 34 to come into contact with the lower part of the second horn 36. The second horn 36 is set to be longer than the first horn 34, and the first striker 14a does not straight enter the loosely fitting groove 32. The first striker 14a crosses the sensing inclined edge surface 86 to come into contact with the lower face of the sensing surface 88 to hold the sensing lever 70 at the sensing position.

Subsequently, as illustrated in FIG. 6, the hook member 20, being elastically biased, turns in the positive direction, and the first striker 14a appropriately engages with the engaging groove 26. The backmost part of the engaging groove 26 is slightly narrower than the first striker 14*a*, and the first striker 14*a* comes into contact with the engaging groove 26 through two places and stably engages therewith. When the hook member 20 turns in the positive direction, the first striker 14*a* is in sliding contact with the right face of the second horn 36; the right face is provided with the gentle bent parts 36*a*, whereby a moderate click feeling is obtained, and the operator can recognize that an appropriate operation is being performed.

The interlock pin 30 escapes from the clearance groove 58, whereby the cam plate 50 turns in the positive direction to be at the limiting position, and the cam surface 54 moderately presses the upper face of the restraining pin 28, thus preventing the wobbling of the hook member 20.

The first striker 14*a* comes into contact with the lower face of the sensing surface 88, thereby holding the sensing lever 70 at the sensing position, and the rod hole 84 is displaced downward. With this configuration, displacement information is transmitted to an indicator via a rod (not illustrated), and the fact that the first striker 14*a* has been surely engaged can be visually determined.

Thus, in the first case, the first striker 14*a* enters and comes into contact with the hook inclined edge surface 24 to turn the hook member 20 in the negative direction, whereby at least a part of the interlock pin 30 once enters the clearance groove. The first striker 14*a* then further enters and comes into contact with the sensing inclined edge surface 86 to turn the sensing lever 70 in the negative direction, whereby the stopper pin 82 leaves the stopper surface 60, and the cam plate 50 turns in the positive direction from the pin retraction position to cause the cam surface 54 to come into contact with the restraining pin 28.

By this action of the sensing lever 70, when the first striker 14*a* enters, the cam plate 50 is held at the pin retraction position, the interlock function is disabled so as to cause the interlock pin 30 not to interfere with the interlock surface 56, and the hook member 20 can be appropriately turned. The first striker 14*a* comes into contact with the hook inclined edge surface 24 and is then caused to come into contact with the sensing inclined edge surface 86 in a delayed manner, and the cam plate 50 can be held at the pin retraction position to make it easy to take operation timing, and the interlock pin 30 is appropriately inserted into the clearance groove 58.

The relative operation and timing of the hook member 20, the cam plate 50, the interlock pin 30, the stopper pin 82, and the stopper surface 60 are not required to be strictly the same as the above. For example, in the foregoing, the interlock pin 30 fits in near the upper end of the opening of the clearance groove 58, but the interlock pin 30 may fit in near the lower end thereof. In the foregoing, the cam plate 50 starts to turn in the positive direction after the interlock pin 30 has fit into the clearance groove 58, but the cam plate 50 may start to move to some extent that there is no interference before the interlock pin 30 fits into the clearance groove 58. It is needless to mention that the operation start timing, the operation end timing, and the operation speed and angle of the components can be adjusted by the length of the arms, the angle of inclination of the sliding inclined faces, and the positions of the pins; the interlock pin 30 is only required to enter the clearance groove 58 regardless of the progress. This is similar in the second case described next.

Figures 1, 9:
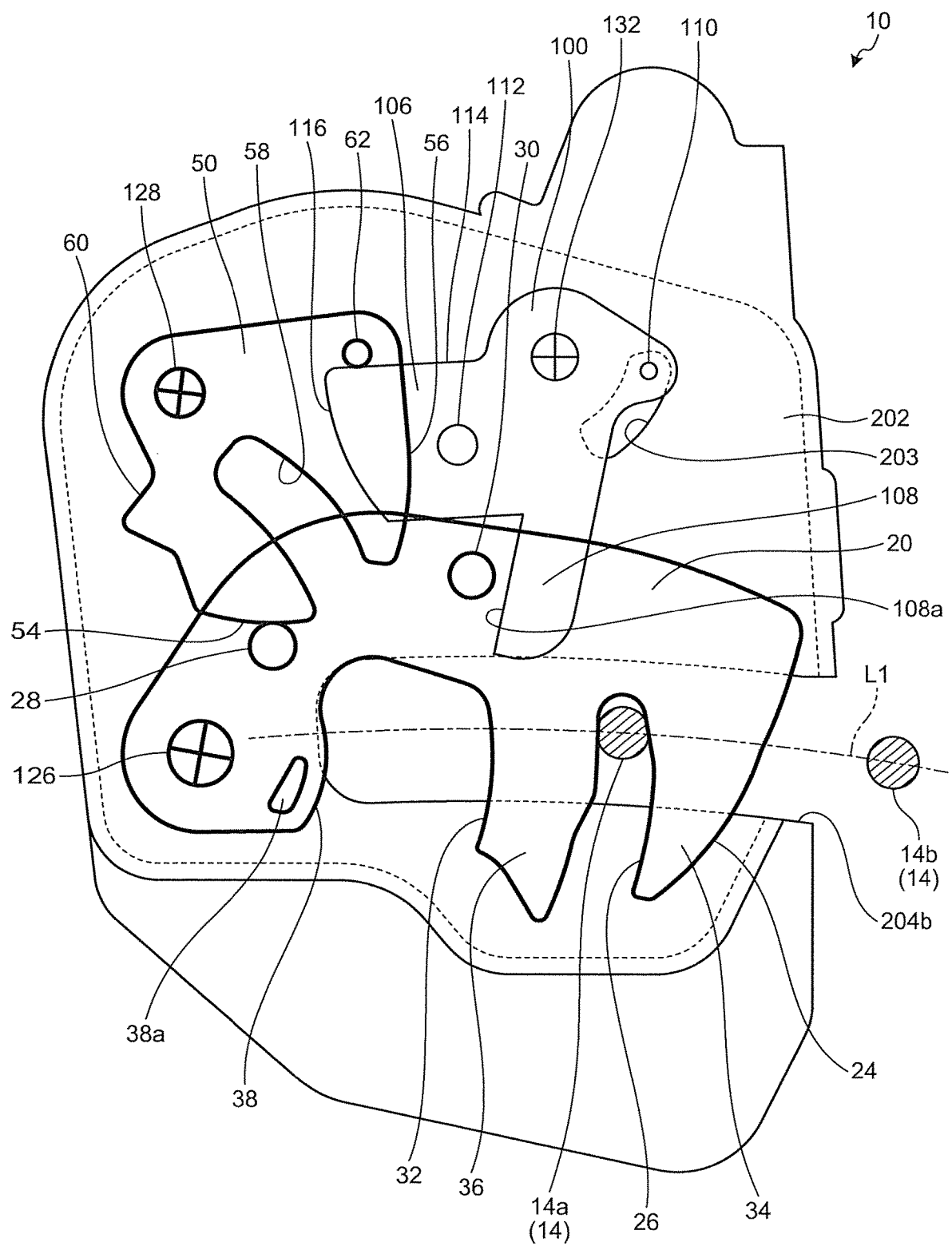
Figures 2, 9:
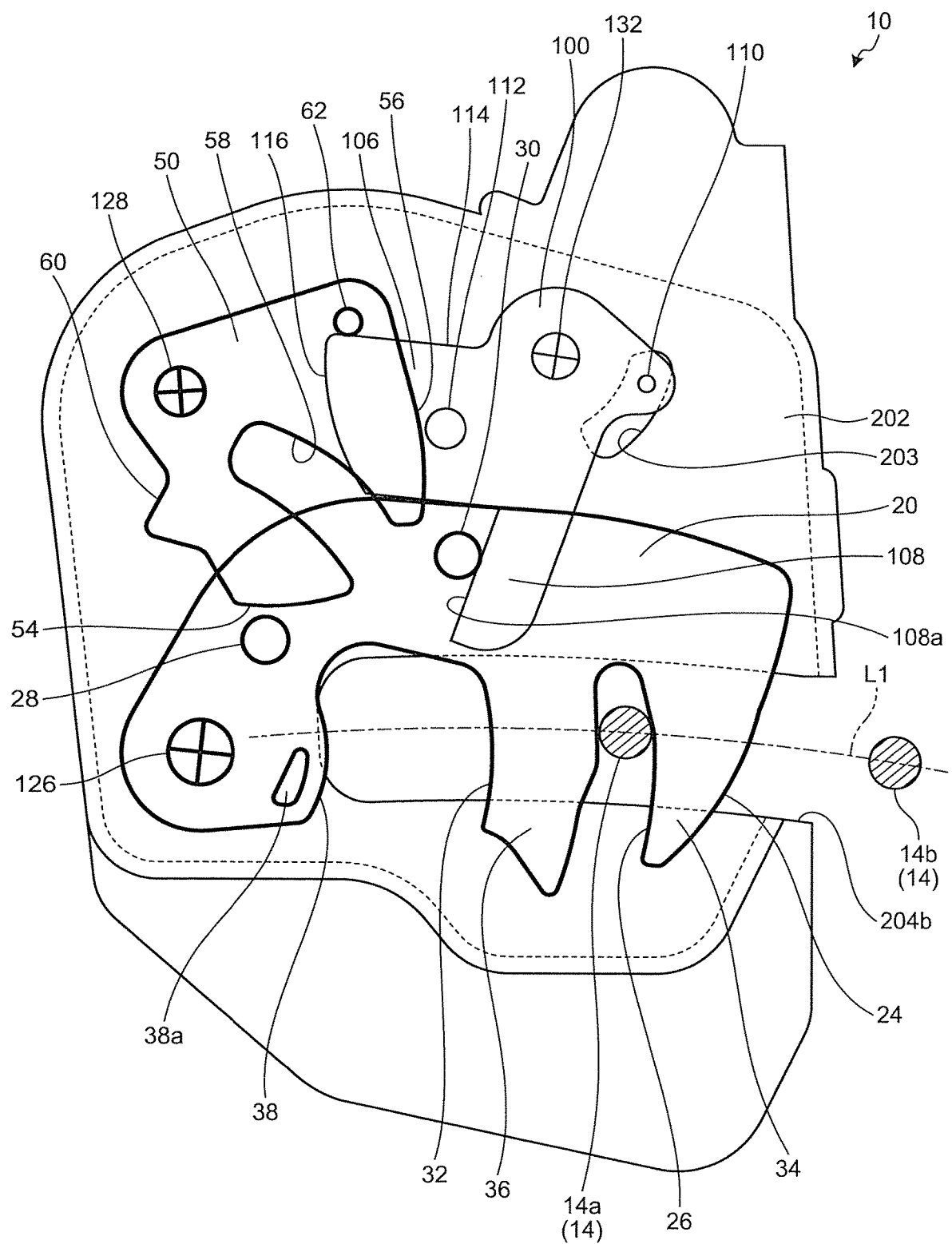
Figures 3, 9:
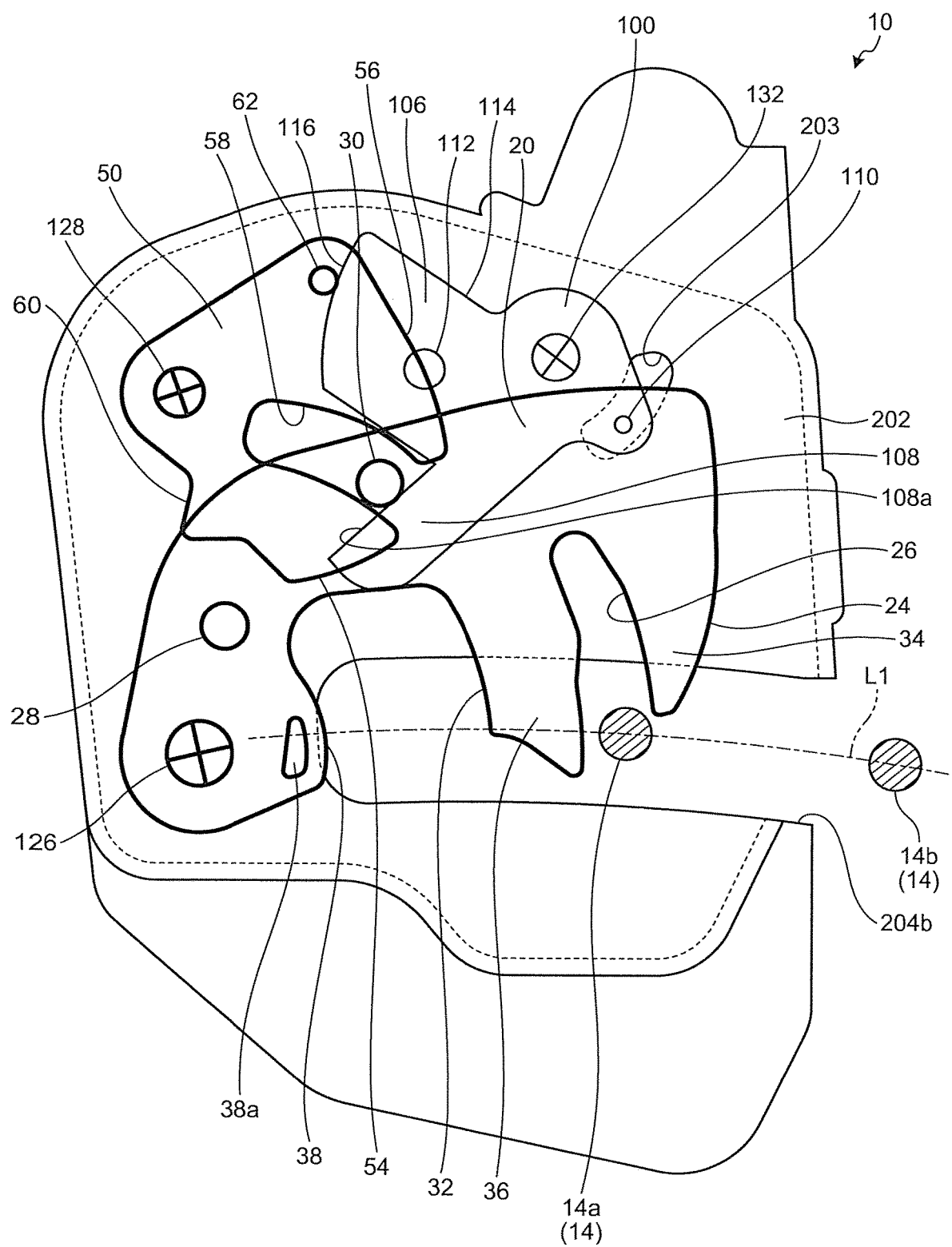
Figures 4, 9:
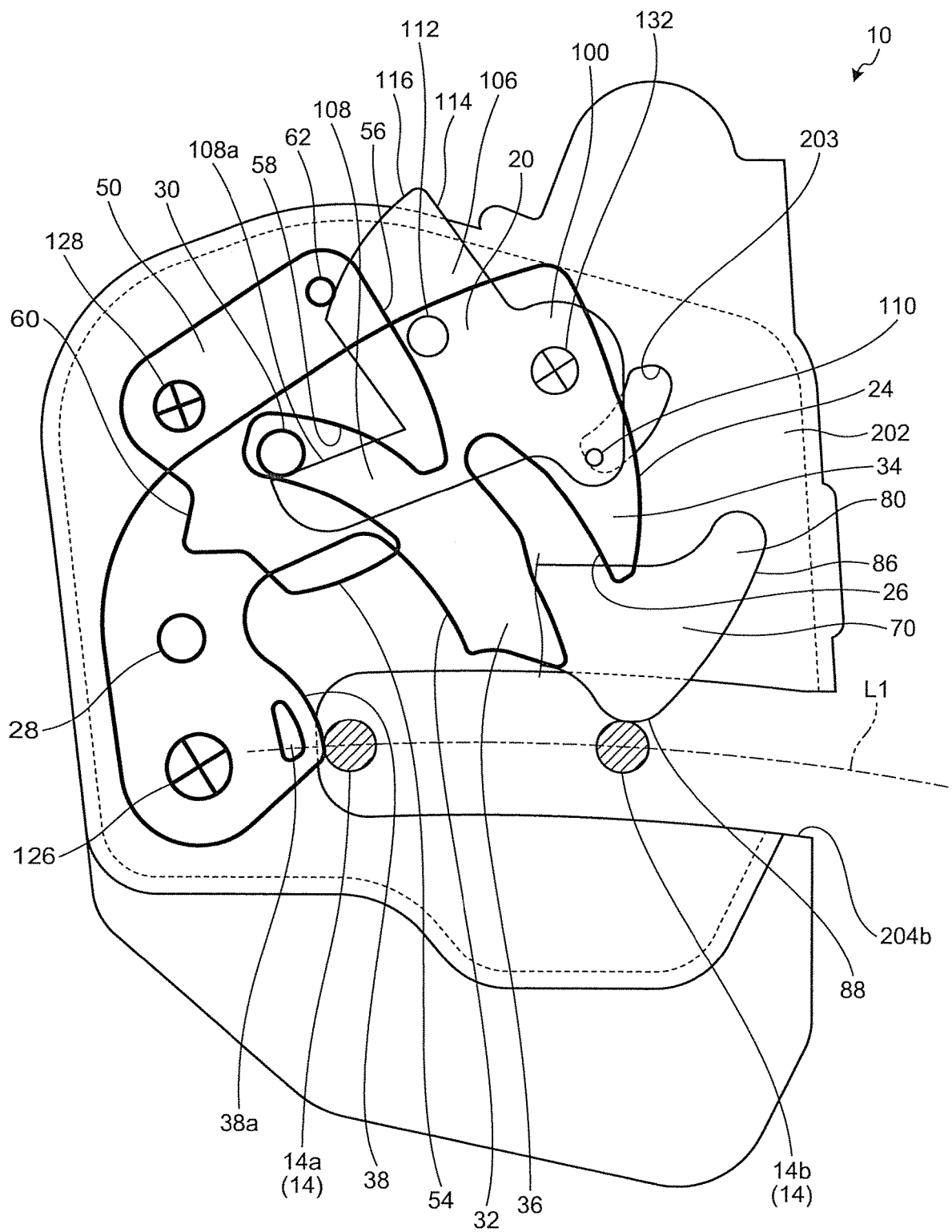
Figures 5, 9:
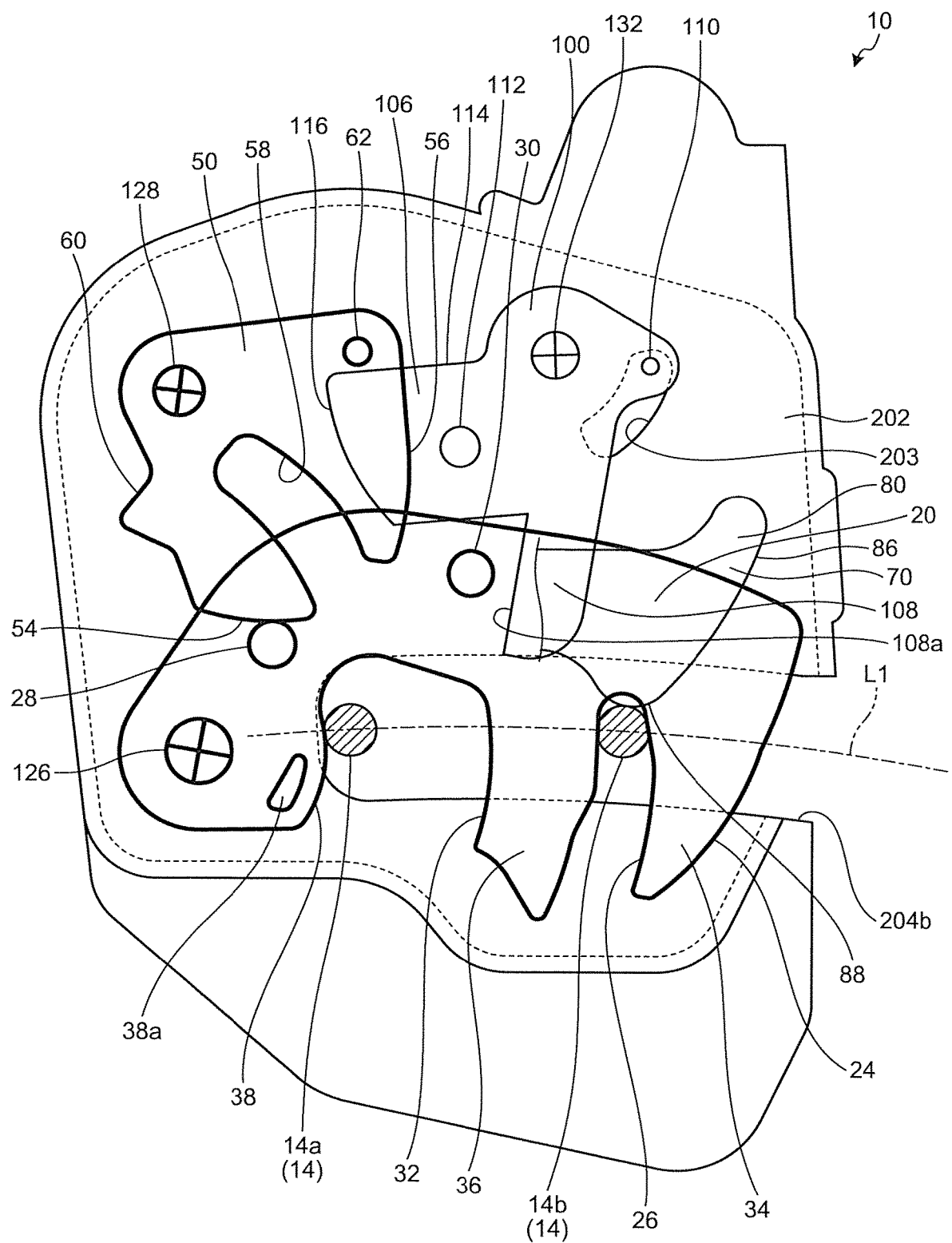

The following describes the action in the second case based on FIG. 9-1 to FIG. 9-5. In other words, described is a case in which the operator operates the operating knob 16 and causes the hook releasing lever 108 to push the interlock pin 30 up under the action of the open lever 100, and the engagement is released. In this process, the seat back 12*b* is shifted from the standard upright attitude to the inclined upright attitude or returned to the lowered attitude by the operator. When viewed from the seat lock device 10, the first striker 14*a* moves to the loosely fitting groove 32, and the second striker 14*b* engages with the engaging groove 26, or the first striker 14*a* separates in the right direction.

FIG. 9-1 to FIG. 9-5 illustrate the hook member 20 and the cam plate 50 by the thick line and illustrate the open lever 100 by the thin line in order to easily discriminate the components from each other and the sensing lever 70 is omitted in order to prevent the drawings from being complicated. The operator pulls the operating rod (not illustrated) connected to the rod hole 112 from the state in FIG. 6, whereby the limiting pin 110 separates from the upper end face of the arcuate hole 203, and the open lever 100 starts to turn in the positive direction to shift to the state illustrated in FIG. 9-1.

As illustrated in FIG. 9-1, when the open lever 100 starts to turn in the negative direction, first, the cam releasing lever surface 114 comes into contact with the lower face of the cam releasing pin 62 of the cam plate 50.

As illustrated in FIG. 9-2, when the open lever 100 further turns, the cam releasing lever surface 114 presses and turns the cam plate 50 in the negative direction while being in sliding contact with the cam releasing pin 62. When the cam releasing pin 62 has moved to near the end of the cam releasing lever surface 114 while being in sliding contact therewith, the hook releasing lever surface 108*a* on the left side of the hook releasing lever 108 comes into contact with the right face of the interlock pin 30. In this process, the cam plate 50 has turned to some extent to form substantially the same angle as the pin retraction position illustrated in FIG. 8-2, and the clearance groove 58 opens in a right-downward direction.

As illustrated in FIG. 9-3, when the open lever 100 further turns, the cam releasing pin 62 crosses the cam releasing lever surface 114 to be in sliding contact with the cam holding curved surface 116, and the cam plate 50 is held at the pin retraction position. Although the pin retraction position of the cam plate 50 at this point in time may be, strictly speaking, different from that of the first case, a position that can avoid the operation of the interlock pin 30 by the clearance groove 58 is referred to as the pin retraction position in a broad sense in the present application for easy understanding. The hook member 20 further turns in the negative direction, the interlock pin 30 is inserted into the clearance groove 58 without interfering with the cam plate 50, and the first striker 14*a* is positioned at the opening of the engaging groove 26. In this process, the angles of the hook member 20 and the cam plate 50 are substantially the same as those in the state illustrated in FIG. 8-4; the first striker 14*a* is limited in the movement in the left direction by the second horn 36 but can freely move in the right direction. Consequently, at this point in time, the operator can lower the seat back 12*b* forward to return it to the lowered attitude.

As illustrated in FIG. 9-4, when the open lever 100 further turns, the limiting pin 110 comes into contact with the lower end face of the arcuate hole 203 at a maximum displaced position, and the turning thereof beyond that is limited. In this process, the first striker 14*a* has completely left the engaging groove 26 to be movable in both right and left directions. When the seat back 12*b* is moved from the standard upright attitude to the inclined upright attitude, the first striker 14*a* and the second striker 14*b* are each caused to enter in the left direction along the entering path L1. With this entrance, the first striker 14a comes into contact with the swelled part 38, and the second striker 14b comes into contact with the lower face of the sensing surface 88. Even when the first striker 14a hits the swelled part 38 rather harder, the impact is relaxed by the buffer hole 38a.

The cam plate 50 is held at the same pin retraction position as the state in FIG. 9-3, and even when the interlock pin 30 enters considerably deep, the interlock pin 30 does not interfere with the cam plate 50.

Subsequently, when the operator stops the pulling operation on the operating knob 16, the open lever 100 elastically turns in the negative direction to return to the original position as illustrated in FIG. 9-5. In this process, the hook member 20, the cam plate 50, and the sensing lever 70 have also returned to the same state as that in FIG. 6. In other words, FIG. 9-5 and FIG. 6 differ from each other only in the positions of the first striker 14a and the second striker 14b. Also in this state, the cam surface 54 presses the restraining pin 28 to prevent the wobbling of the hook member 20. The sensing surface 88 of the sensing lever 70 once lowers along with the movement of the first striker 14a and again rises by contact with the second striker 14b, and the fact that the second striker 14b has been appropriately engaged is detected.

Thus, in the second case, when the open lever 100 is turned in the positive direction, after the cam releasing lever surface 114 comes into contact with the cam releasing pin 62, the hook releasing lever surface 108a comes into contact with the interlock pin 30 in a delayed manner. The cam plate 50 turns prior to the hook member 20 to be held at the pin retraction position, and the hook member 20 rotates, whereby at least a part of the interlock pin 30 once enters the clearance groove 58. With this configuration of the open lever 100, at the time of releasing engagement, the cam plate 50 is turned prior to the hook member 20 to be held at the pin retraction position, the interlock function is disabled so as to cause the interlock pin 30 not to interfere with the interlock surface 56, and the hook member 20 can be appropriately turned.

The cam plate 50 is held at the pin retraction position prior to the hook member 20, whereby operation timing can be easily taken, and the interlock pin 30 is appropriately inserted into the clearance groove 58. Further, even when the turning range of the open lever 100 is large, the cam plate 50 continues to be appropriately held at the pin retraction position by the cam holding curved surface 116.

Figure 10:
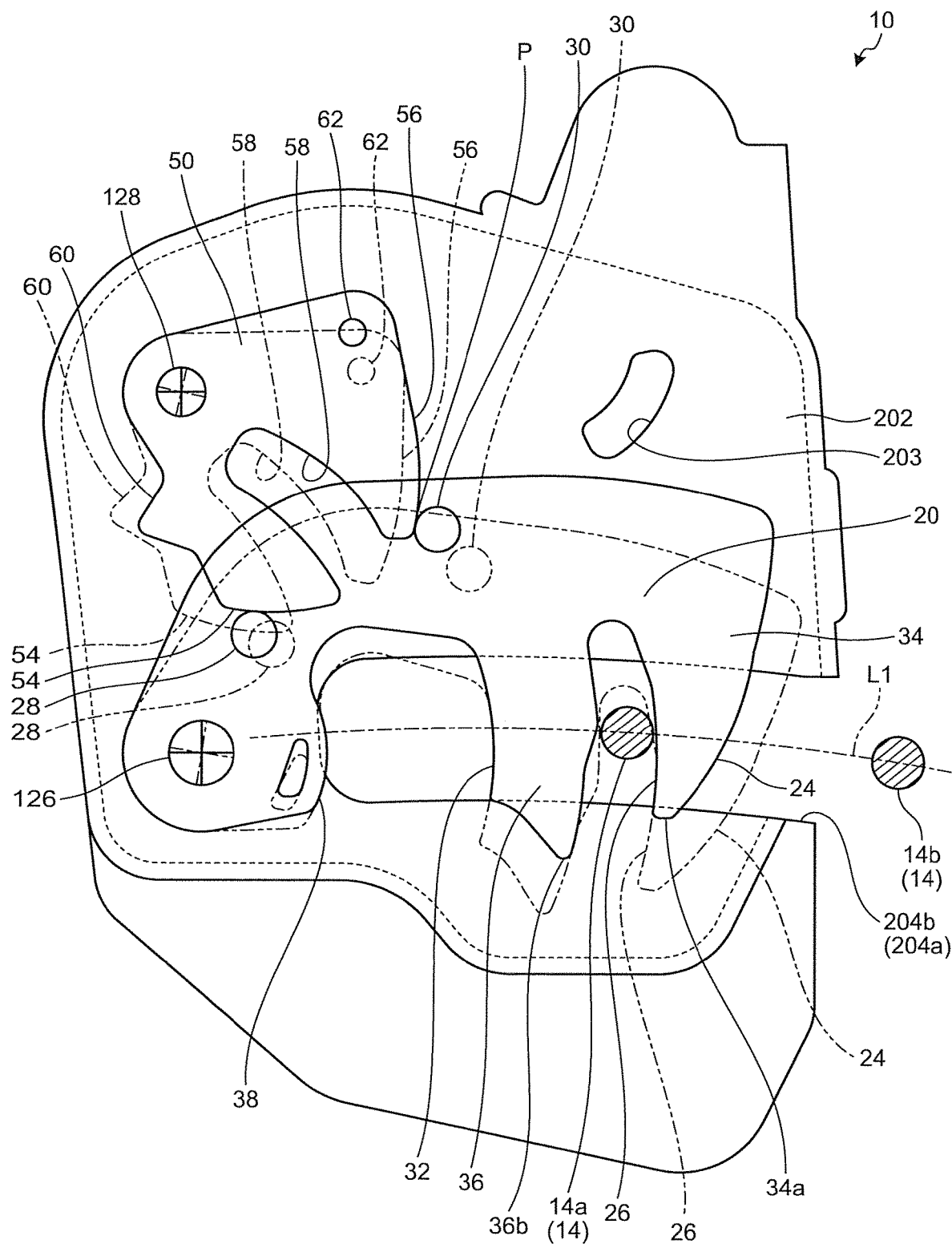
FIG. 10 is a schematic diagram of a third case in which the hook member turns.

The following describes the action in the third case based on FIG. 10. In other words, described is a case in which the hook member 20 has received large vibration or impact to turn in the negative direction regardless of the intention of the operator. In this process, the seat back 12b is at the standard upright attitude or the inclined upright attitude, and it is desirable that the engagement of the striker 14 and the engaging groove 26 not be released accidentally by vibration or impact. In FIG. 10, the sensing lever 70 and the open lever 100 are omitted in order to prevent the drawing from being complicated. The hook member 20 and the cam plate 50 illustrated by the virtual line in FIG. 10 are in the same state as that illustrated in FIG. 6, which is a state in which the striker 14 engages with the engaging groove 26. In this situation, even when the hook member 20 receives small vibration or impact, the restraining pin 28 is pressed by the cam surface 54, and the hook member 20 is prevented from wobbling and does not turn in the negative direction.

As illustrated in FIG. 10, when the hook member 20 has received large vibration or impact, the restraining pin 28 can slightly turn in the negative direction while pressing the cam surface 54. In this process, unlike the first case and the second case, the cam plate 50 is not at the pin retraction position, and the interlock pin 30 comes into contact with the interlock surface 56 without fitting into the clearance groove 58. Before the striker 14 escapes from the engaging groove 26, the interlock pin 30 comes into contact with the interlock surface 56 at a contact point P, and the turning of the hook member 20 beyond that is limited.

In other words, at the normal locked position, the hook member 20 is elastically inhibited from turning in the negative direction by the cam surface 54 and is further surely blocked by the interlock mechanism by the interlock surface 56, and the striker 14 does not escape from the engaging groove 26. This interlock mechanism has no relation to the open lever 100, and the open lever 100 can be formed smaller in size and lighter in weight, thus improving operability.

At the contact point P, impact forces applied to the cam plate 50 are set to be directed to the turning of the cam plate 50 in the positive direction by the contact direction of the interlock pin 30 and the angle of inclination of the interlock surface 56, whereby the cam plate 50 does not turn in the negative direction beyond that, and the hook member 20 can be surely stopped. When the vibration or impact stops, the hook member 20 turns in the positive direction by an elastic force and returns to the state illustrated by the virtual line.

As described above, the seat lock device 10 according to the present embodiment can improve the operability for releasing the engagement of the hook member 20 and the striker 14 and can prevent the wobbling of the hook member 20. In addition, the four main components appropriately operate in cooperation with each other while bearing their share of the functions; specifically, the hook member 20 bears the function of engaging with the striker 14, the cam plate 50 bears the function of inhibiting the operation of the hook member 20, the sensing lever 70 bears the function of detecting the position of the striker 14 and the function of holding the cam plate 50 at the pin retraction position, and the open lever 100 bears the function of releasing the striker 14. By this bearing of their share of the functions, each single body of the components is configured to be simple and lighter in weight with little waste. The open lever 100 configured to be smaller in size and lighter in weight, in particular, makes the feeling of operation of the operating knob 16 lighter. In addition, the entire weight of the seat lock device 10 is also reduced. Although the seat lock device 10 has the two-stage lock mechanism, the actions of the cam plate 50, the sensing lever 70, the open lever 100, and the like are effective also for a one-stage lock mechanism.

It is needless to mention that the present invention is not limited to the embodiment and can be freely altered to the extent not departing from the gist of the present invention.

REFERENCE SIGNS LIST

10 Seat lock device
12 Seat
12a Seat cushion
12b Seat back
14, 14a, 14b Striker
16 Operating knob
20 Hook member
22, 52, 72, 102 Shaft hole
24 Hook inclined edge surface
26 Engaging groove
28 Restraining pin
30 Interlock pin (hook releasing pin)

32 Loosely fitting groove
34 First horn
34a, 36b Tip
36 Second horn
36a Bent part
50 Cam plate
54 Cam surface
56 Interlock surface
58 Clearance groove
60 Stopper surface
62 Cam releasing pin
70 Sensing lever
74, 104 Spring chamber
76 First arm
78 Second arm
80 Detector
82 Stopper pin
84, 112 Rod hole
86 Sensing inclined edge surface
88 Sensing surface
100 Open lever
106 Cam release acting unit
108 Hook releasing lever
108a Hook releasing lever surface
110 Limiting pin
114 Cam releasing lever surface
116 Cam holding curved surface
126, 128, 130, 132 Shaft
134, 138, 140, 144 Torsion spring
142, 148 Adapter
200 Cover member
201 Bottom surface
202 Base member
203 Arcuate hole
204a, 204b Striker entering groove
206 Mounting hole
L1 Entering path
L2 Perpendicular line

The invention claimed is:

1. A seat lock device comprising:
a hook member elastically rotationally biased in a positive direction; and
a cam plate elastically rotationally biased in the positive direction,
wherein the hook member includes:
a hook inclined edge surface that is provided on another end relative to a support shaft near one end and is rotationally biased in a negative direction by contact with a striker entering;
an engaging groove with a depth into which the striker entering fits after crossing the hook inclined edge surface to bring the hook member into a locked position;
a restraining pin protruding sideways; and
an interlock pin protruding sideways,
the cam plate is set to a limiting position that limits turning of the hook member in the negative direction when the hook member engages with the striker to be at the locked position and is switched to an allowing position that allows the turning of the hook member in the negative direction when the striker enters and when an operation to release an engagement of the striker has been performed, and
the cam plate includes:
a cam surface that comes into contact with the restraining pin to rotationally bias the hook member in the positive direction when being at the limiting position; and
an interlock surface with which the interlock pin comes into contact before the striker escapes from the engaging groove when the hook member has turned in the negative direction from the locked position.

2. The seat lock device according to claim 1, further comprising:
a sensing lever elastically rotationally biased in the positive direction,
wherein the sensing lever includes:
a sensing inclined edge surface rotationally biased in the negative direction by contact with the striker entering; and
a stopper pin, provided on a side opposite to the sensing inclined edge surface when viewed from a support shaft, that presses a stopper surface of the cam plate to hold the cam plate at the allowing position when the striker is separate at an initial position,
the cam plate has a clearance groove provided between the cam surface and the interlock surface, and
when the striker enters and comes into contact with the hook inclined edge surface to turn the hook member in the negative direction, the cam plate is held at the allowing position by the stopper pin so as to cause at least a part of the interlock pin to enter the clearance groove.

3. The seat lock device according to claim 2, wherein
the striker enters, comes into contact with the sensing inclined edge surface, and turns the sensing lever in the negative direction to separate the stopper pin from the stopper surface, and
the cam plate is turned in the positive direction from the allowing position to cause the cam surface to come into contact with the restraining pin.

4. The seat lock device according to claim 2, wherein the striker when entering comes into contact with the hook inclined edge surface and then comes into contact with the sensing inclined edge surface in a delayed manner.

5. The seat lock device according to claim 2, wherein the sensing lever includes a sensing face that comes into contact with the striker to hold the sensing lever at a sensing position when the striker fits into the engaging groove at an end of the sensing inclined edge surface and a unit that transmits a fact that the sensing lever is at the sensing position to an external indicator.

6. The seat lock device according to claim 2, further comprising:
an open lever elastically rotationally biased in the negative direction,
wherein the open lever includes:
a hook releasing lever that, when being turned in the positive direction through a force received from an operating unit, presses a hook releasing pin provided in the hook member while being in sliding contact with the hook releasing pin to turn the hook member in the negative direction until the striker escapes from the engaging groove, and
a cam releasing lever surface that presses a cam releasing pin provided in the cam plate while being in sliding contact with the cam releasing pin to turn the cam plate in the negative direction to the allowing position, and
when the open lever is turned in the positive direction, and the hook member is turned in the negative direction, the cam plate is turned to the allowing position so as to cause at least a part of the interlock pin to enter the clearance groove.

7. The seat lock device according to claim 6, wherein the open lever includes:
- a cam holding curved surface that is formed continuously from an end of the cam releasing lever surface and holds the cam plate at the allowing position while being in sliding contact with the cam releasing pin, and when the open lever is turned in the positive direction, after the cam releasing lever surface has come into contact with the cam releasing pin, the hook releasing lever comes into contact with the hook releasing pin in a delayed manner, and the cam plate turns prior to the hook member to be held at the allowing position.

8. The seat lock device according to claim 6, wherein the open lever further includes:
- a limiting pin that limits a turning range sideways.

9. The seat lock device according to claim 6, wherein the cam plate is provided on an open lever side of an entering path of the striker and on a support shaft side of the hook member of a perpendicular line passing through a support shaft of the open lever and relative to the entering path when viewed along an axial direction of the hook member.

10. The seat lock device according to claim 1, wherein
the striker is a first striker, and the first striker integrally operates together with a second striker spaced apart by a fixed distance,
the hook member includes a loosely fitting groove between the engaging groove and a support shaft, and
after the hook member has turned in the negative direction, and the first striker has escaped from the engaging groove based on an operation by an operator, the first striker further enters to enter the loosely fitting groove, the second striker reaches an entrance of the engaging groove, and the hook member returns in the positive direction to cause the first striker to loosely fit into the loosely fitting groove and to cause the second striker to engage with the engaging groove.

* * * * *